(12) United States Patent
Loveland

(10) Patent No.: US 6,810,383 B1
(45) Date of Patent: Oct. 26, 2004

(54) AUTOMATED TASK MANAGEMENT AND EVALUATION

(75) Inventor: James B. Loveland, Orem, UT (US)

(73) Assignee: Xactware, Inc., Orem, UT (US)

( * ) Notice: Subject to any disclaimer, the term of this patent is extended or adjusted under 35 U.S.C. 154(b) by 0 days.

(21) Appl. No.: 09/544,191

(22) Filed: Apr. 6, 2000

Related U.S. Application Data

(60) Provisional application No. 60/177,425, filed on Jan. 21, 2000.

(51) Int. Cl.[7] .............................................. G06F 17/60
(52) U.S. Cl. ...................... 705/9; 705/7; 705/8; 705/11
(58) Field of Search .............................. 705/9, 7, 8, 11

(56) References Cited

U.S. PATENT DOCUMENTS

| | | | |
|---|---|---|---|
| 5,128,859 A | | 7/1992 | Carbone et al. ............. 364/401 |
| 5,182,705 A | | 1/1993 | Barr et al. ................... 364/401 |
| 5,343,387 A | * | 8/1994 | Honma et al. ................. 705/9 |
| 5,432,904 A | | 7/1995 | Wong .......................... 395/161 |

(List continued on next page.)

FOREIGN PATENT DOCUMENTS

| EP | WO 95/26535 | * 10/1995 | ........... G06F/17/60 |
|---|---|---|---|

OTHER PUBLICATIONS

Bryant, Tim, "Getting things built in Russia—a developer's diary", Sep. 1996, Cost Engineering, v38n9, pp:20–23.*
"Contact Opportunities", Oct. 24, 1997, Set–Aside Alert, v5, n22, p N/A.*
"Sources Sought aand Long Range opportunities", Dec. 5, 1997, Set–Aside Alert, v5,n24, p n/a.*
"Sources Sought aand Long Range opportunities", Nov. 21, 1997, Set–Aside Alert, v5,n23, p n/a.*

*Primary Examiner*—Tariq R. Hafiz
*Assistant Examiner*—Akiba Robinson-Boyce
(74) *Attorney, Agent, or Firm*—Kirton & McConkie; Michael F. Krieger

(57) ABSTRACT

The present invention relates to a method and apparatus for electronically managing the assignment of tasks to be completed. Preferred embodiments incorporate a computer network to gather and disseminate information for the processes of embodiments of the present invention. Task information is gathered until a task is sufficiently defined to be assigned. At this point the task is assigned to a service provider who is requested to respond to the assignment. The response is monitored and if unacceptable or not received the task will be transferred to another service provider until a satisfactory response is received. An estimate of the cost of task completion may then be requested and authorization to complete the task may be contingent upon an acceptable estimate. Once a service provider is authorized to complete a task, the provider's progress is monitored and reported to interested parties. Provider quality ratings may be incorporated into some embodiments. Reports, analyses and other data may be automatically generated by embodiments of the present invention. Applications of embodiments of the present invention may be particularly useful in claims processing in the insurance industry.

16 Claims, 25 Drawing Sheets

U.S. PATENT DOCUMENTS

| | | | | |
|---|---|---|---|---|
| 5,504,674 A | | 4/1996 | Chen et al. | 364/401 |
| 5,546,564 A | | 8/1996 | Horie | 395/500 |
| 5,627,973 A | * | 5/1997 | Armstrong et al. | 705/10 |
| 5,640,505 A | * | 6/1997 | Hearn et al. | 714/4 |
| 5,758,329 A | * | 5/1998 | Wojcik et al. | 705/28 |
| 5,765,138 A | * | 6/1998 | Aycock et al. | 705/7 |
| 5,765,140 A | * | 6/1998 | Knudson et al. | 705/9 |
| 5,826,239 A | * | 10/1998 | Du et al. | 705/8 |
| 5,839,112 A | | 11/1998 | Schreitmueller et al. | 705/4 |
| 5,848,403 A | * | 12/1998 | Gabriner et al. | 706/13 |
| 5,870,711 A | | 2/1999 | Huffman | 705/8 |
| 5,875,431 A | * | 2/1999 | Heckman et al. | 705/7 |
| 5,907,848 A | | 5/1999 | Zaiken et al. | 707/202 |
| 5,920,846 A | * | 7/1999 | Storch et al. | 705/7 |
| 5,950,169 A | | 9/1999 | Borghesi et al. | 705/4 |
| 5,956,687 A | | 9/1999 | Wamsley et al. | 705/1 |
| 5,963,911 A | | 10/1999 | Walker et al. | 705/7 |
| 6,049,776 A | * | 4/2000 | Donnelly et al. | 705/8 |
| 6,070,142 A | * | 5/2000 | McDonough et al. | 705/7 |
| 6,101,479 A | * | 8/2000 | Shaw | 705/8 |
| 6,115,693 A | * | 9/2000 | McDonough et al. | 705/10 |
| 6,134,530 A | * | 10/2000 | Bunting et al. | 705/7 |
| 6,185,555 B1 | * | 2/2001 | Sprenger et al. | 705/3 |
| 6,321,133 B1 | * | 11/2001 | Smirnov et al. | 700/100 |

* cited by examiner

AUTOMATED TASK MANAGEMENT AND EVALUATION

This application claims the benefit of 60/177,425 filed Jan. 21, 2000.

THE FIELD OF THE INVENTION

The present invention relates to methods and apparatus for automated assignment of tasks to service providers, automated implementation of rules governing the performance of tasks, monitoring of rules compliance by providers and evaluation of the providers overall ability to efficiently accomplish such tasks. It also includes an automatically updated database which matches willing and complying task service providers to interested task assignors.

The system of embodiments of the present invention serves to coordinate and communicate between service consumers, service providers and insurers, warrantors, liability holders or other interested parties. When a task is entered into the system, the task is identified by type and a database of service providers is accessed so that a capable service provider, willing to comply with established rules of task performance, may be assigned that task. When a qualified service provider is found, the task is automatically assigned to that service provider. Tasks may be reassigned when service providers do not comply with established system rules. Task assignment may be performed electronically through telephone, fax, cell phone, pager, e-mail, radio or by many other communication means.

Task progress and service provider quality are monitored and reported as the task is completed. Reports, including graphical reports, may be generated to show multi-tiered trending analyses and other analyses at any level, from industry-wide down to specific line items associated with a task.

BACKGROUND

Insurance providers, warrantors, maintenance managers, construction contractors, factory managers and many other service consumers who must repetitively assign tasks to other parties can benefit from a system which automatically assigns and monitors tasks. As a non-limiting example, insurance providers must process claims for damages to insured property. When a claim is made, the insurance provider often desires to contact a professional to make an estimate of the cost to repair the damage. Once the estimate is received, the insurance provider will often make adjustments, negotiate with service or product providers or otherwise evaluate the estimate. When the estimate is acceptable, and the rules of task completion are established, a service provider is authorized to complete the work.

Repair work on automobiles, residences, commercial buildings and other structures can often be an extensive and lengthy process. Work must often be monitored over a period of time to ensure that proper repairs are being made and that funds are being spent properly. Payments may be made in draws contingent upon completion of specific tasks. Events during the repair process must be monitored and tracked continuously to ensure a smooth and efficient process.

Service consumers who employ independent contractors and other service providers can benefit from a thorough knowledge of the provider's history, reputation and past work experience. After several contacts, a service consumer begins to get a feel for the quality of work and service that a contractor provides. However, some managers deal with far too many service providers to keep track of each one of them. A system that monitors and evaluates service providers by keeping track of their performance can be invaluable.

SUMMARY AND OBJECTS OF THE INVENTION

Some embodiments of the present invention comprise a task input system which collects task information for processing. An exemplary embodiment in the insurance industry may comprise a claims collection system where insured parties may file claims on insured property. A preferred embodiment uses an Internet-based claim filing system wherein insured parties may access and fill out web-based forms to input claims information. Information input to the forms is automatically compiled and analyzed so that the claims may be processed. In addition to a web-based forms approach, selected third-party software users may input claims information into their third-party software and send formatted data streams directly to a user's receiving server. Task or claim information may be text based, graphical, audible or in other formats.

Task or claim information may be augmented by internal files or databases of embodiments of the present invention which may contain task requestor data. In the case of an insurance claim, the internal data may comprise insurance policy limits, policy expiration dates, prior claims made, and other data.

When task information is sufficiently complete, the task may be automatically assigned to a service provider whose information is located in a database which is maintained and managed through the systems and methods of the present invention. The service provider database, in an exemplary embodiment, contains service provider names, addresses, phone numbers, e-mail addresses and other contact information as well as information regarding the provider's experience, types of tasks completed, quality ratings, bonding or insurance limits, costs of tasks completed and other information. A service provider in this exemplary embodiment may be a building contractor who is hired to repair fire damage on an insured residence.

Once an embodiment of the present invention has determined that task information is complete, a service provider is selected. This selection may be based on the type of claim made including the type of work involved in satisfying the claim, the estimated claim cost, the quality rating of the service provider, the location of the service provider and many other factors. When a service provider is selected, that provider will be notified automatically through the methods and apparatus of the present invention. This notification may occur via telephone, cell phone, e-mail or other communications media.

A notified service provider may then be required to respond to the notification within a prescribed time period. If no response is received in compliance with the system's rules of escalation, the system will either automatically notify the service provider's quality control agent such as a franchise organization if (where applicable), or the system may simply select another service provider who will then be given a period to respond. A task or assignment will automatically be transferred to another service provider either until a compliant response is received or until all automated options have been exhausted. Upon exhaustion of all options for automated assignment, the system automatically alerts the entity owning the assignment of the actions taken, the entities involved and rules broken, and then awaits additional escalation instruction. These rules of escalation may be based upon response times and methods or other parameters and may be established or changed by service provider management, the system user, the task requester or others. Alerts may be sent to any interested parties through any available communications media.

When a provider has been selected and assigned a task and a proper response has been logged, the provider may then respond by submitting an estimate of the cost of completing the task. This estimate may be based on a site visit by the service provider or may be based on information provided to the service provider through the system of embodiments of the present invention. Graphical information such as digitized plans and photographs and other descriptive information may be provided to the service provider through the systems and methods of embodiments of the present invention. This information may be augmented by a site visit by the service provider.

A service provider may calculate an estimate through proprietary methods. However, the system and method of embodiments of the present invention also provide an electronic method of estimation in an on-line format so that properly formatted estimates may be forwarded to the system user or other designated parties. This estimate may then be evaluated relative to the costs of similar tasks performed in the past, or it may be evaluated relative to an automated estimating system. This evaluation process may be automated or, alternatively, may be performed manually by an expert evaluator. If the estimate conforms with the parameters of the evaluation process, whether automated or manual, the provider who supplied the estimate may be authorized to perform the task. Password protection may be used to keep sensitive information confidential.

Authorization will preferably be performed automatically and electronically by one or more of several means. Preferable authorization means include, but are not limited to, conventional telephone, cell phone, e-mail, pager and radio.

Selected embodiments of the present invention will track the provider's progress and report to the task requestor/consumer, user, financer or other parties as the task is completed. This event tracking may be used to authorize partial payments to the service provider as events comprised within a task are completed. Event tracking may also be used to evaluate a service provider's performance.

Event tracking and other monitoring aspects of embodiments of the present invention may be used to generate a quality rating for service providers listed in system databases. Quality ratings may also be based on other input from service consumers, claimants and other parties. In a preferred embodiment of the present invention, a customer survey is implemented through web-based forms, direct consumer contact or other means. A consumer satisfaction factor is calculated based on this data. This consumer satisfaction data is augmented with service provider performance data obtained through the system of embodiments of the present invention. Performance data may be based on provider response data such as, but not limited to, time of response, type of response, estimate quality, estimate amounts relative to automated estimates, time to complete task and other performance factors.

Embodiments of the present invention may also have the ability to perform analyses on the information gathered by the system and other information otherwise input into the system. These analyses may be performed on task data, service provider data, task requestor data or other system information. Reports may be generated to help a user analyze and predict trends in their industry. These trending analyses may be multi-tiered allowing the user to generate reports, including graphical reports, based on industry-wide data, single task specific data or anything in between. For example, and not by way of limitation, an insurance company may generate a "type of loss" report for the entire company which lists occurrences for each loss type in graphical form. This report may be further broken down by region, state, city or even down to specific claims as needed by the user. Other reports may be generated at any level to help a user understand key aspects of their business and these reports may be customized for a specific business or business type.

Accordingly, it is an object of some embodiments of the present invention to provide a system and apparatus for automated assignment of tasks.

It is also an object of some embodiments of the present invention to provide a system and apparatus for monitoring and reporting task progress.

Another object of some embodiments of the present invention is to provide a system and apparatus for quality control.

A further object of some embodiments of the present invention is to provide a system and apparatus for alerting a user regarding the response of a service provider.

Another object of some embodiments of the present invention is to provide a system and apparatus for trending analysis.

These and other objects and features of the present invention will become more fully apparent from the following, description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
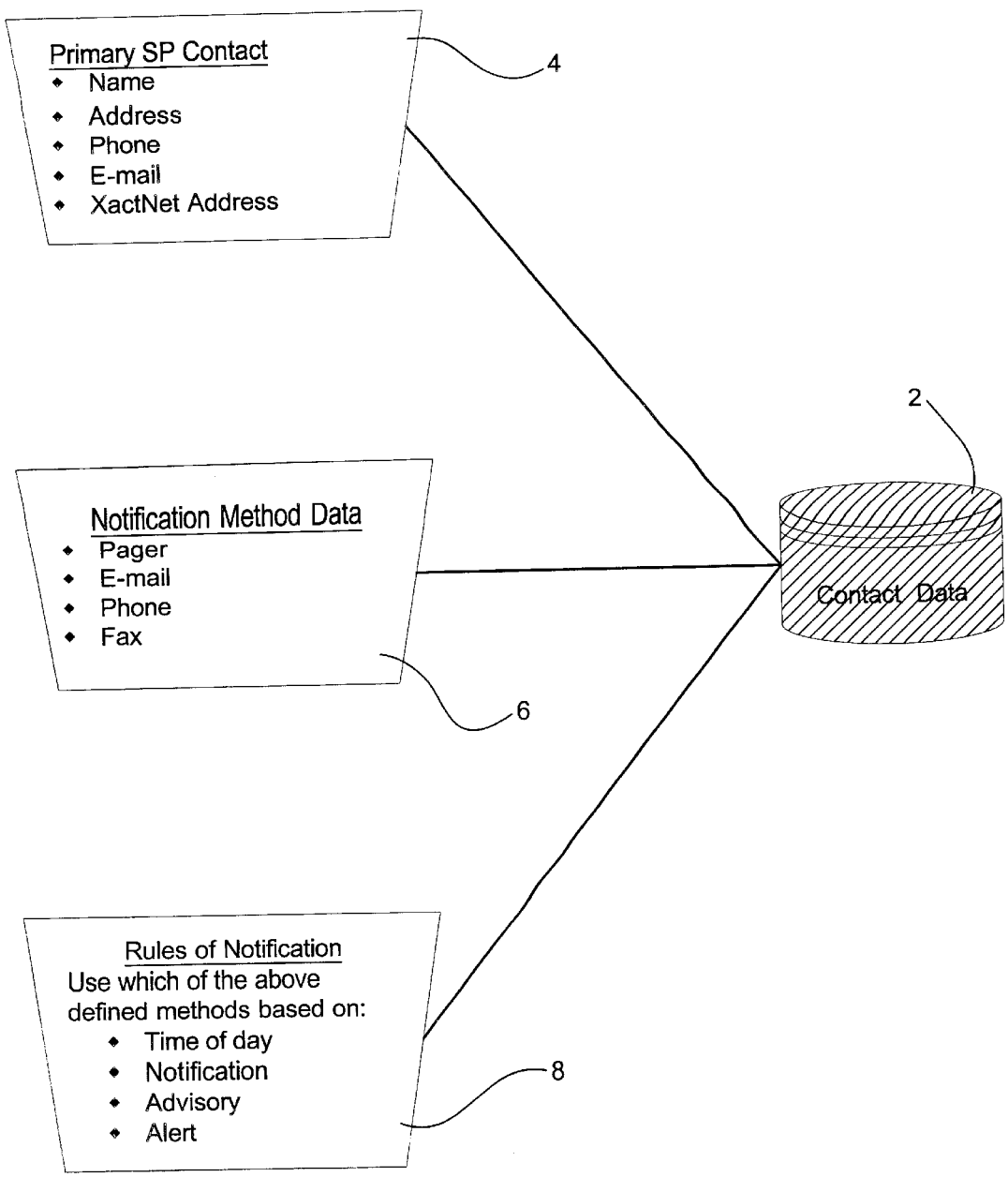
FIG. 1 is a diagram illustrating details of contact data.

The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the system and apparatus of the present invention, as represented in FIGS. 1 through 25, is not intended to limit the scope of the invention, as claimed, but it is merely representative of the presently preferred embodiments of the invention.

The currently preferred embodiments of the present invention will be best understood by reference to the drawings, wherein like parts are designated by like numerals throughout.

Embodiments of the present invention may be used in many different industries which include, without limitation, insurance providers, warrantors, maintenance managers, construction contractors, factory managers and many other service consumers who must repetitively assign tasks to other parties. While embodiments of the present invention may be used in many applications, an application in the insurance industry is thought to be illustrative of many of these embodiments and is used herein as a non-limiting example of these embodiments.

Some embodiments of the present invention comprise a task input system which collects task information for processing. An exemplary embodiment in the insurance industry may comprise a claims collection system where insured parties may file claims on insured property. A preferred embodiment uses an Internet-based claim filing system wherein insured parties may access and fill out web-based forms to input claims information. Information input to the forms is automatically compiled and analyzed so that the claims may be processed. In addition to a web-based forms approach, selected third-party software users may input claims information into their third-party software and send formatted data streams directly to a receiving server of an embodiment of the present invention. Task or claim information may be text based, graphical, audible or in other formats.

Task or claim information may be augmented by internal files or databases of embodiments of the present invention which may contain task requester data. In the case of an insurance claim, the internal data may comprise policy holder addresses, contact information, records of insured property, insurance policy limits, policy expiration dates, information regarding prior claims made, and other data.

When task information is sufficiently complete, the task may be automatically assigned to a service provider whose information is located in a database which is maintained and managed through the systems and methods of the present invention. The service provider database, in an exemplary embodiment, contains service provider names, addresses, phone numbers, e-mail addresses and other contact information as well as information regarding the provider's experience, types of tasks completed, quality ratings, bonding or insurance limits, costs of tasks completed and other information. A service provider in this exemplary embodiment may be a building contractor who is hired to repair fire damage on an insured residence.

The systems, methods and apparatus of embodiments of the present invention comprise databases which store various information used by these embodiments. These databases may be stored as a single database file with information organized for selective access or may be stored as a combination of files which are completely distinct or organized in some type of file hierarchy. Some database files may be stored on a network server accessible to all users, other files may be protected by selective and controlled access. Some database files may also be stored in a divided format with portions located on one physical storage device while others are located on another storage device. The databases and files of embodiments of the present invention may be combined or arranged in any number of formats that achieve the function of those embodiments. Any storage method which provides the function of embodiments of the present invention is to be considered within the scope of embodiments of the present invention.

In reference to FIG. 1, embodiments of the present invention comprise a contact database which contains information needed to contact a service provider which may be available for task assignment. Contact database 2 comprises primary company contact data 4 including, but not limited to, the name, address, phone numbers, e-mail addresses and other information for contacting a service provider. This information may exist for individuals or for larger business entities. Contact database 2 also comprises notification method data 6 which is a record of a particular service provider's communication contact preferences. A service provider or other contact may identify what communication methods are preferred for communication of assignments, authorization or other information. As a non-limiting example, a service provider may prefer to be contacted with an initial assignment by pager and business telephone, but prefer to receive alert information by e-mail. These preferences are recorded in notification method data 6 to improve communication efficiency and ensure prompt contact.

Communication with service providers may also be modified by rules of notification 8 which are used to adjust communication parameters according to time of day, work priority, success of the primary contact method or some other factor. As a non-limiting example, a service provider may want to be contacted by telephone during business hours and by pager at other times. In another non-limiting example, a service provider may wish to receive typical assignments by e-mail, but receive emergency assignments by pager, cell phone or some other method or combination of methods.

Figure 2:
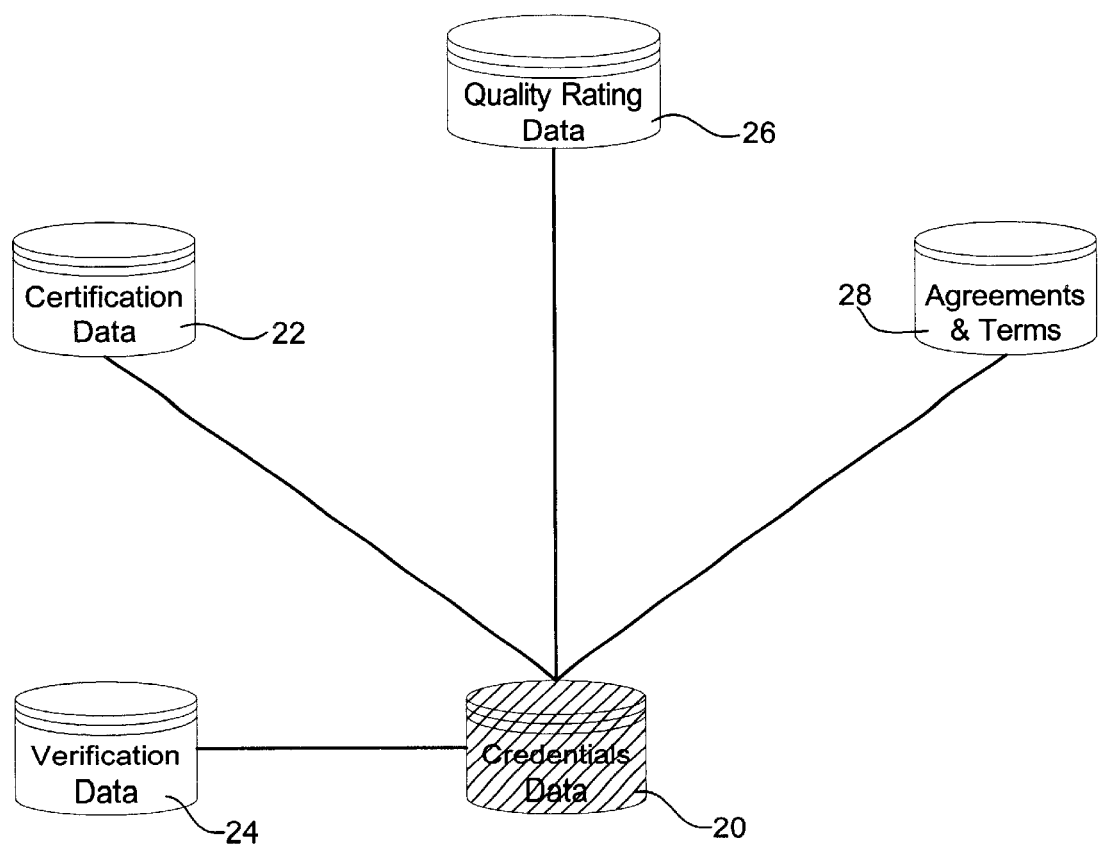
FIG. 2 is a diagram illustrating details of credentials data.

Systems of embodiments of the present invention also comprise a credentials database 20, as shown in FIG. 2, which comprises information related to a service provider's qualifications and prior agreements including, but not limited to, quality ratings, certificates, agreements, qualification verification and other information.

Figure 3:
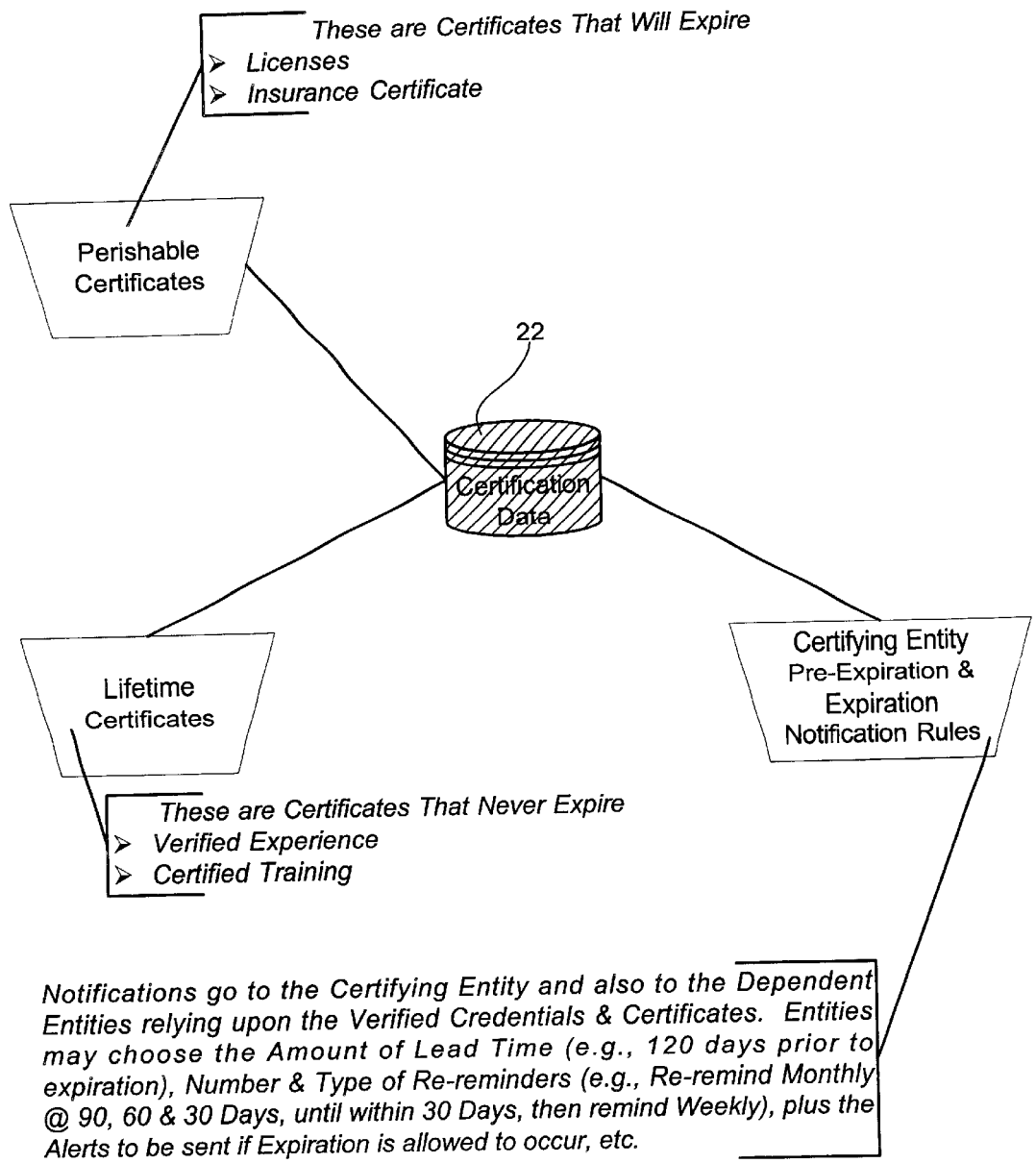
FIG. 3 is a diagram illustrating details of certification data.

In a preferred embodiment of the present invention, credentials database 20 comprises a certification database 22, as shown in FIG. 3, which may contain records regarding certification of service providers. Certification database 22, may comprise records of service provider certifications such as contractor licenses, business licenses, insurance company approvals, specialized training certificates, bonding certificates, and other documents relating to service provider approval, acceptance and certification by other entities. Certification database 22 may comprise information regarding perishable certificates which must be renewed periodically to maintain a certified status. Certification database 22 may also comprise information regarding permanent certificates which remain valid for the life of a certificate holder. Certification database 22 may further comprise notification rules for notifying certificate holders, parties who have assigned tasks to certificate holders, certifying agencies and others of the status of perishable certificates. Alert messages may also be delivered under these notification rules to alert parties of impending certificate expiration.

Some embodiments of certification database 22 may also provide for automated renewal of perishable certificates for subscribing service providers.

Notification rules may also comprise rules for multiple and repeated alert and notification of parties who select this function. Notification and alert messages may be communicated through any electronic communication media including automated phone messages, e-mail, conventional mail messages, beeper messages and others. Certification database 22 may also comprise records of parties who rely on a specific service provider's certification so that these relying parties may also be notified of certification expiration or related information.

Certification database 22 may also comprise information regarding a service provider's experience. This experience information is typically related to an amount of time worked in a given field or on a type of project. This information will generally need to be updated regularly to accurately reflect a service provider's current experience. Embodiments of the present invention may automatically update time based information. For example, and not by way of limitation, certification database 22 may be automatically updated annually to reflect a service provider's total work experience as of that year. Particular types of work experience may also be maintained according to the types of jobs performed by a service provider.

In select embodiments of the present invention, credentials database 20 may also comprise verification data 24, as shown in FIG. 2, which comprises data related to verified credentials. For example, and not by way of limitation, a service provider may be required to be bonded for a specific monetary amount. This bonding requirement may be directly verified by a bonding company who has issued a policy or bond to the service provider. Verification database 24 may comprise the name and address of the verifying entity, the certification being verified, the time period for which the certification is being verified, contact information and other related information. Automated verification may also be performed through access to a verification database or similar system maintained by the verifying entity.

Figure 4:
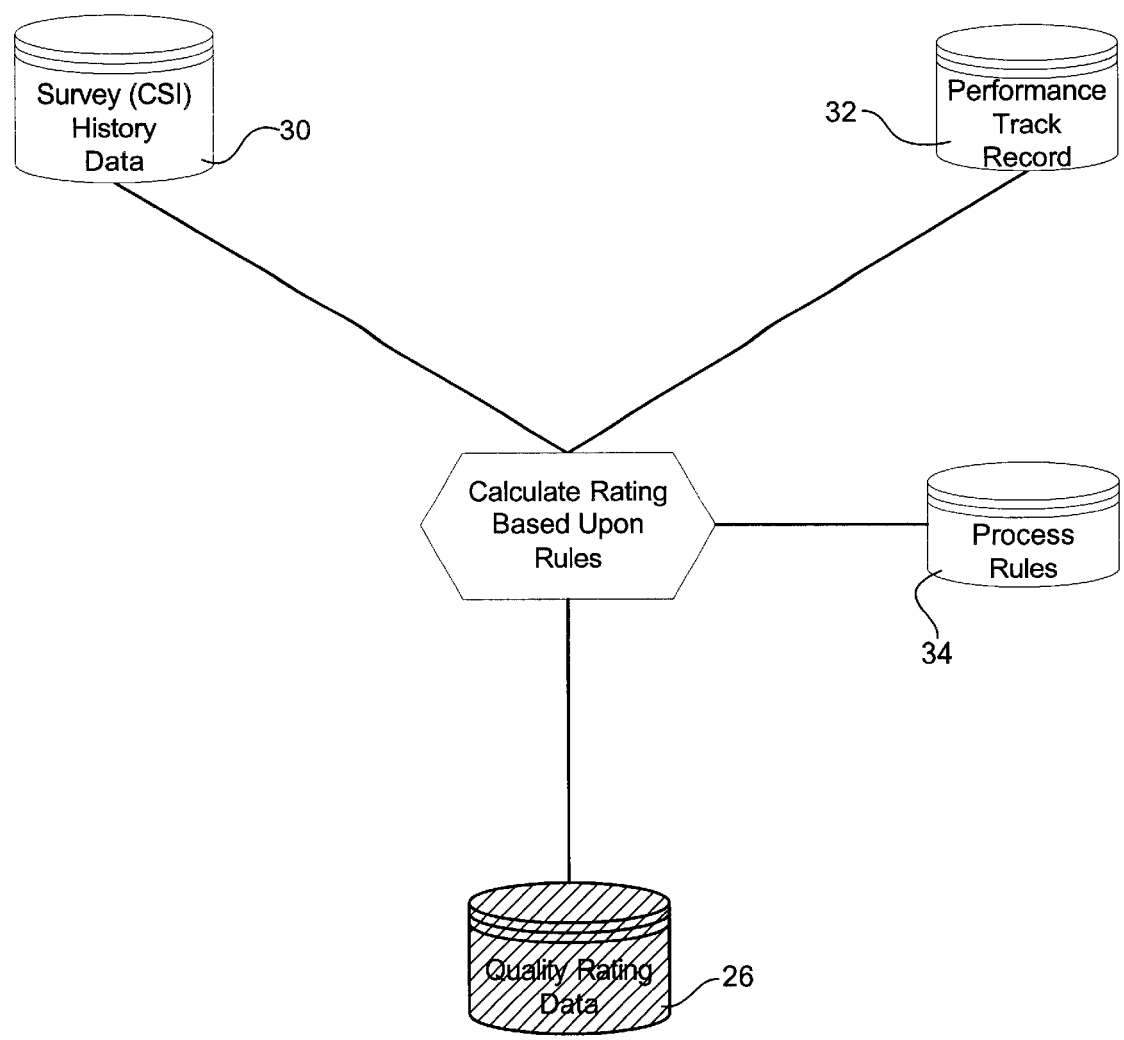
FIG. 4 is a diagram showing details of quality rating data.

In some embodiments of the present invention, credentials database 20 may also comprise quality rating data 26, as shown in FIGS. 2 and 4, which comprises information related to a service provider's performance and quality of work. In reference to FIGS. 4 and 5, quality rating data 26 may comprise information related to a service provider's performance track record 32 as compared with performance terms 28 defined in agreements, schedules, industry standards, typical client expectations and other performance factors. This quality rating data 26 may be compiled and stored as a numeric score or other quality rating to reflect a service provider's overall quality or data may be stored as specific data related to work performance and quality such as, but not limited to, contact promptness, budget compliance, scheduling compliance and other factors.

In order to compare a service provider's performance with agreed-upon terms, specific events in a service provider's project may be selected and tracked 36 to establish a performance track record 32. Performance terms 28 may be compared to tracker data 36 to determine compliance with terms 28. When a service provider meets or exceeds the performance terms 28, his performance track record 32 will reflect that positive performance.

In some embodiments, a service provider may also be required to report compliance with specific rules, or agreement terms in order to determine compliance with related rules or schedules.

Quality rating database 26 may also comprise survey data 30 provided by a party having knowledge of a service provider's performance and work quality. A party providing survey data may be an entity for which a task has been assigned, for example an insurance company may complete a survey regarding a service provider's performance. Survey data 30 may also be provided by an insurance claimant or other party associated with the provider's work. In a preferred embodiment, a survey form is automatically sent in an electronic format to one or more parties associated with a service provider's work. When the form is completed, it is returned and automatically processed by the system of the present invention so that quality rating data 26 may be processed automatically.

Figure 5:
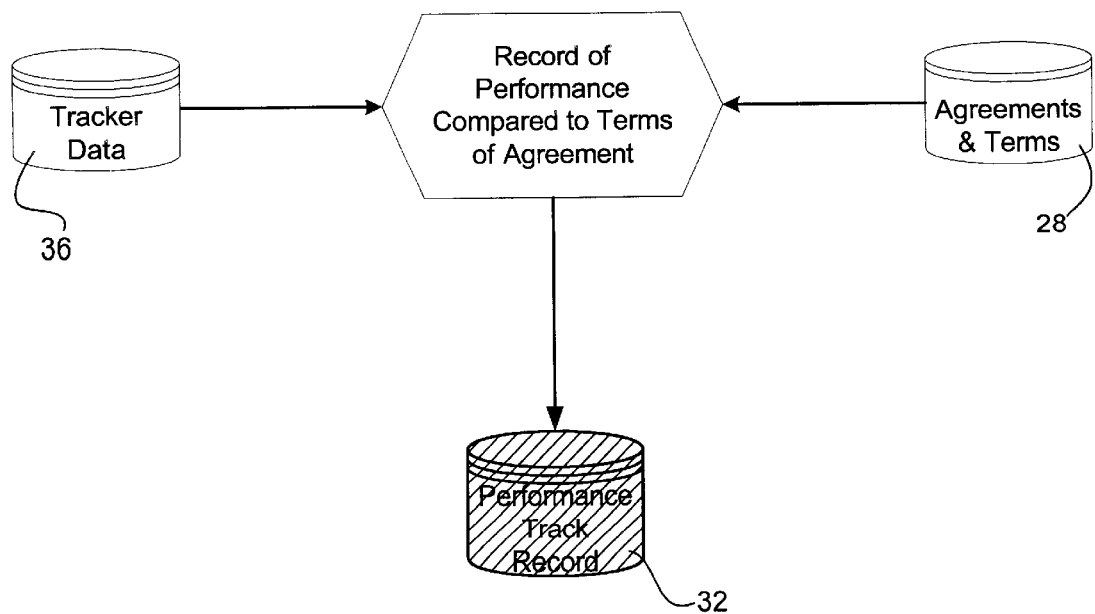
FIG. 5 is a diagram illustrating details of performance track record data.

In reference to FIG. 2, credentials data 20 may further comprise agreement and term data 28 which may be accessed by many portions of embodiments of the present invention. Agreement and term data 28 may be used to determine a service provider performance track record 32, as shown in FIG. 5, it may also be used to help define process parameter data 36 as well as other aspects of embodiments of the present invention. Agreement and term data 28 may comprise the entire text of agreements between the service provider and a customer or other associated parties or it may comprise relevant portions of the text of these agreements. Data 28 may also comprise a record of agreement acceptance such as an electronic signature, a digitized copy of the signed agreement or some other agreement acceptance verification.

Agreements and terms data 28 may also comprise rules which a service provider has agreed to perform. These rules may include an obligation to submit standardized information during task performance such as, but not limited to, the completion of automated surveys during or at the completion of a task. These rules may also comprise escalation report rules which involve obligations to contact parties within a specified time period or to decline or reassign a task when it can not be completed according to specified parameters. These rules may also comprise pre-escalation rules including rules governing acceptance and acknowledgment of task assignments as well as others.

Figure 6:
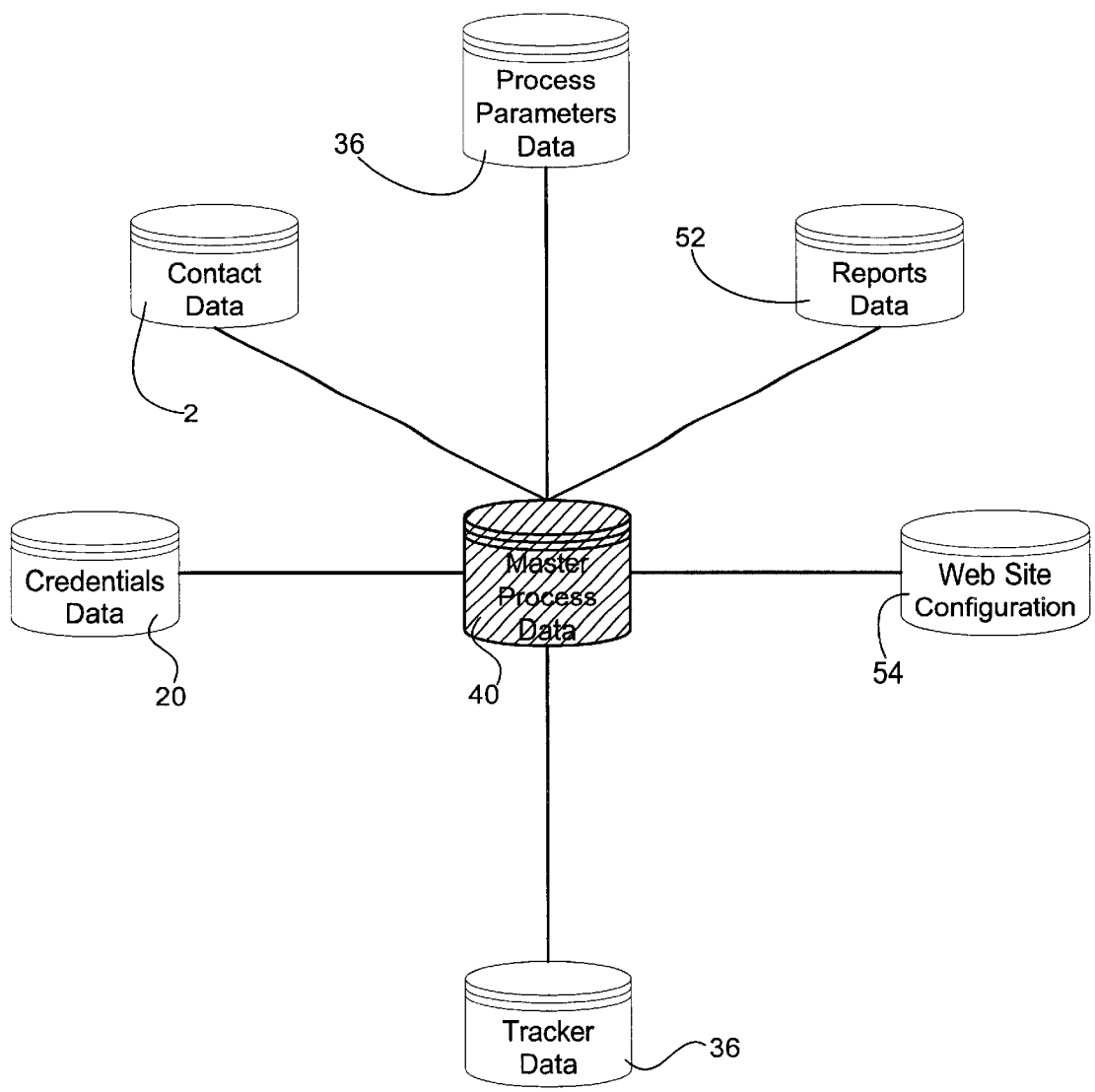
FIG. 6 is a diagram illustrating details of master process data.
Figure 7:
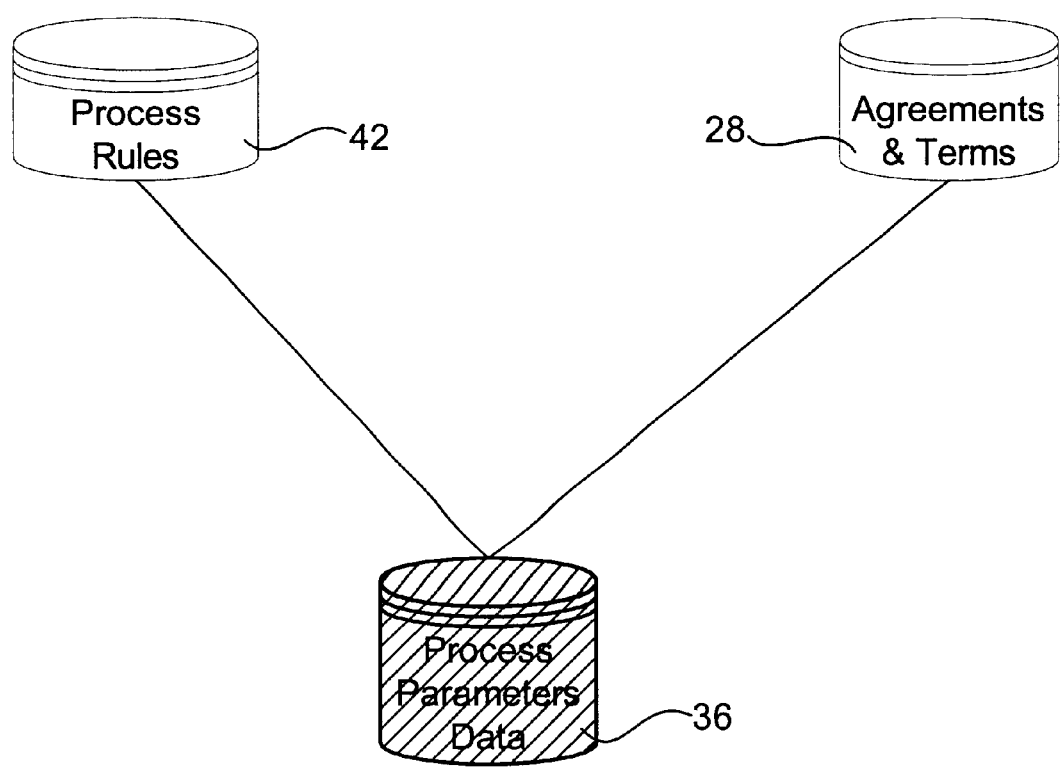
FIG. 7 is a diagram illustrating details of process parameters data.

Contact data 2 and credentials data 20 may form a part of master process data 40, as shown in FIG. 6, which further comprises other elements in a preferred embodiment. One of these other elements is process parameters data 36 which may contain agreements and terms data 28 as well as process rules 42, as shown in FIG. 7. Agreements and terms data 28 are described above.

Figure 8:
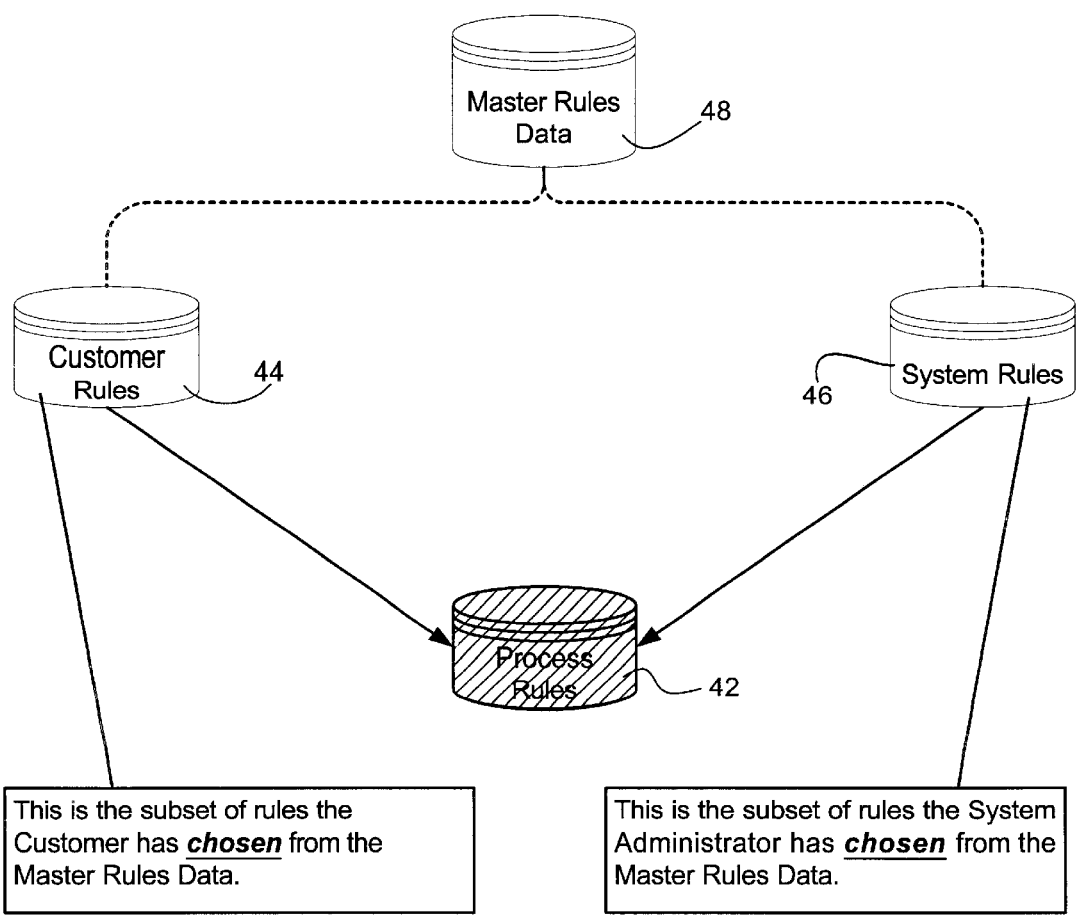
FIG. 8 is a diagram illustrating details of master rules data.

Process rules 42 may be further explained in reference to FIG. 8 where elements of some embodiments are shown. Process rules 42 may comprise customer rules 44 which are rules which are established by a customer for a specific task. A customer will establish these rules prior to a task assignment to ensure that a service provider will meet the customer's scheduling or other needs. These rules may be selected by the customer from a set of pre-defined rules which are stored in the system of embodiments of the present invention, preferably in master rules database 48. Alternatively, a customer may create custom rules to meet specific needs using a rule creation language which may be accessed by the customer over a network connection such as through the Internet or by some other means.

Process rules 42 may also comprise system rules 46 which are defined by a system administrator to govern the execution of a task. Similar to customer rules 44, system rules 46 may be selected by the system administrator from a set of pre-defined rules preferably stored in master rules database 48. When custom rules are desired, the administrator may also use a rule creation language to define and set custom rules for specific tasks.

Figure 9:
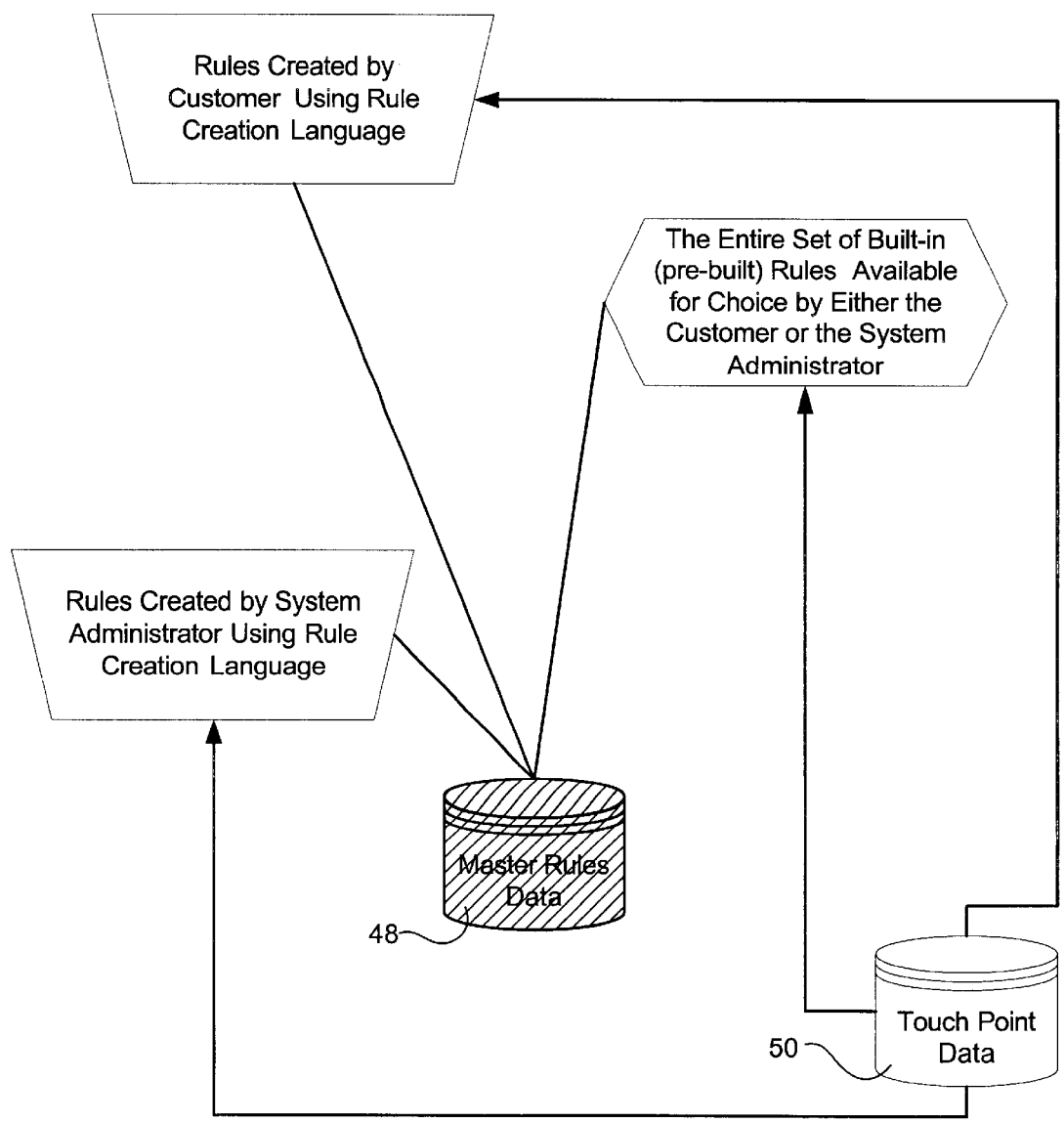
FIG. 9 is a diagram illustrating details of master rules data.

In reference to FIG. 9, master rules database 48 of a preferred embodiment of the present invention will comprise all rules created by a system administrator using a rule creation language and any rules created by a customer using a rule creation language. Master rules database 48 will also comprise a complete set of pre-defined rules which may be selected by either the system administrator, a customer or another party with authority to create and modify rules. These rules may be organized hierarchically such that a rule may operate upon the result of another rule.

Rules within master rules database 48 and other logic within embodiments of the present invention may operate of data logged as touch point data 50. Touch point data 50 comprises data which is automatically stored during the processes of embodiments of the present invention. This data may be used as operators, variables and other process modifiers upon which rules may operate. Rules may comprise boolean logic, mathematical equations and other logic which requires variable input. This input may be acquired through standardized data gathering or touch point processing which stores touch point data 50 for further processing or for direct access by users or processes. Touch point data 50 may comprise, for example, and not by way of limitation, the date and time a claim is filed or a task is requested, the date and time the claim or task is accepted, the date and time an assignment is sent, the date and time a customer is contacted by a service provider, the date and time an estimate is received form a service provider, the occurrence of rule violations or other data relevant to the events of the processes of embodiments of the present invention. Touch point data 50 may comprise raw data such as times and dates as well as data which has been processed by logical processes or otherwise transformed.

Master process data 40, as shown in FIG. 6, may also comprise report data 52 which comprises information relevant to reports generated by embodiments of the present invention. These reports may be automatically generated by the processes of the present invention and automatically transmitted to parties with proper communication connections.

Figure 10:
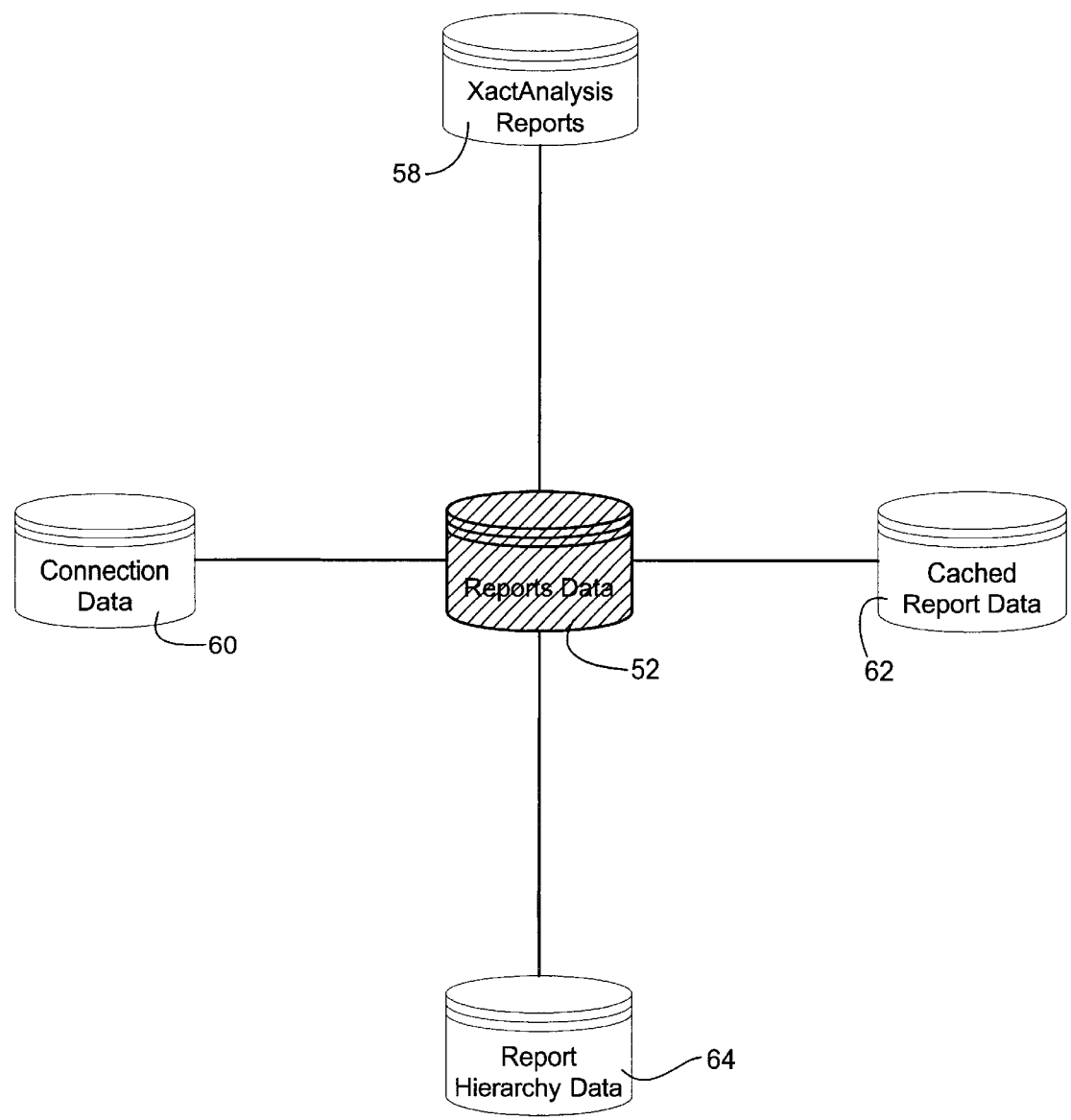
FIG. 10 is a diagram illustrating details of reports data.

Report data 52, in a preferred embodiment, will comprise connection data 60, as shown in FIG. 10, comprising the types of reports to be transmitted directly to subscribing parties along with report formatting information, reporting frequency information and other report parameters. Report data 52 may also comprise connection and communication parameters for configuring and establishing communication connections with receiving parties.

Report data 52 may also comprise report hierarchy data 64 which establishes a relationship between parties who may receive reports. Reports may be generated with varying levels of scope. These levels may relate to data for an agent, adjustor, estimator or other individual or may be tailored to relate data for a particular office in which these individuals work. Likewise, reports may be generated by company, region, state and country as well as by type of individual, type of coverage and other factors. The relationships between individuals, geographical regions, types of work and other parameters are recorded in report data 52 so that reports may be automatically generated and transmitted for specific applications.

In some embodiments of the present invention, report caching is used to provide quicker and more convenient report access. When this is the case, report data 52 will comprise cached report data 62 for selected reports. When a party needs priority access to report data, that party may request that a report be cached. The report will then be designated for caching and stored in a format that will speed access. Caching may comprise methods such as memory caching where the report is stored in high-speed memory or may comprise methods with high-speed data transmission connections or other methods to speed report delivery. Caching may also comprise pre-processing techniques which assemble data into specific report formats which are stored for direct access as opposed to assembling the report from raw data when the report is requested. E-mail or other notification methods may also be employed to alert a user that a report has completed caching or generating.

Report data 52 may also comprise analysis report data 58 which allows for user customization of reports and establishment of report hierarchy as well as real time report generation. Analysis report data 58 provides a user with a menu from which a user may select the type of report desired. A user may select from pre-formatted report types or may create a customized report format by indicating the desired data fields and the scope of the report. Report hierarchy may also be established and revised by a user through methods comprised in analysis report data 58. A user may designate relationships between individuals and companies, regions or other hierarchichal subdivisions. Analysis report data 58 may also comprise a method for selecting reports for real-time processing and caching. Users who need up-to-date, real-time data may select their reports for real-time processing so that current data is always reflected in their reports. These reports may be made available on-line so that users may access the reports at any time. Some forms of caching may also be selected for quicker access, however cached data must be updated regularly for real-time reporting.

Figure 11:
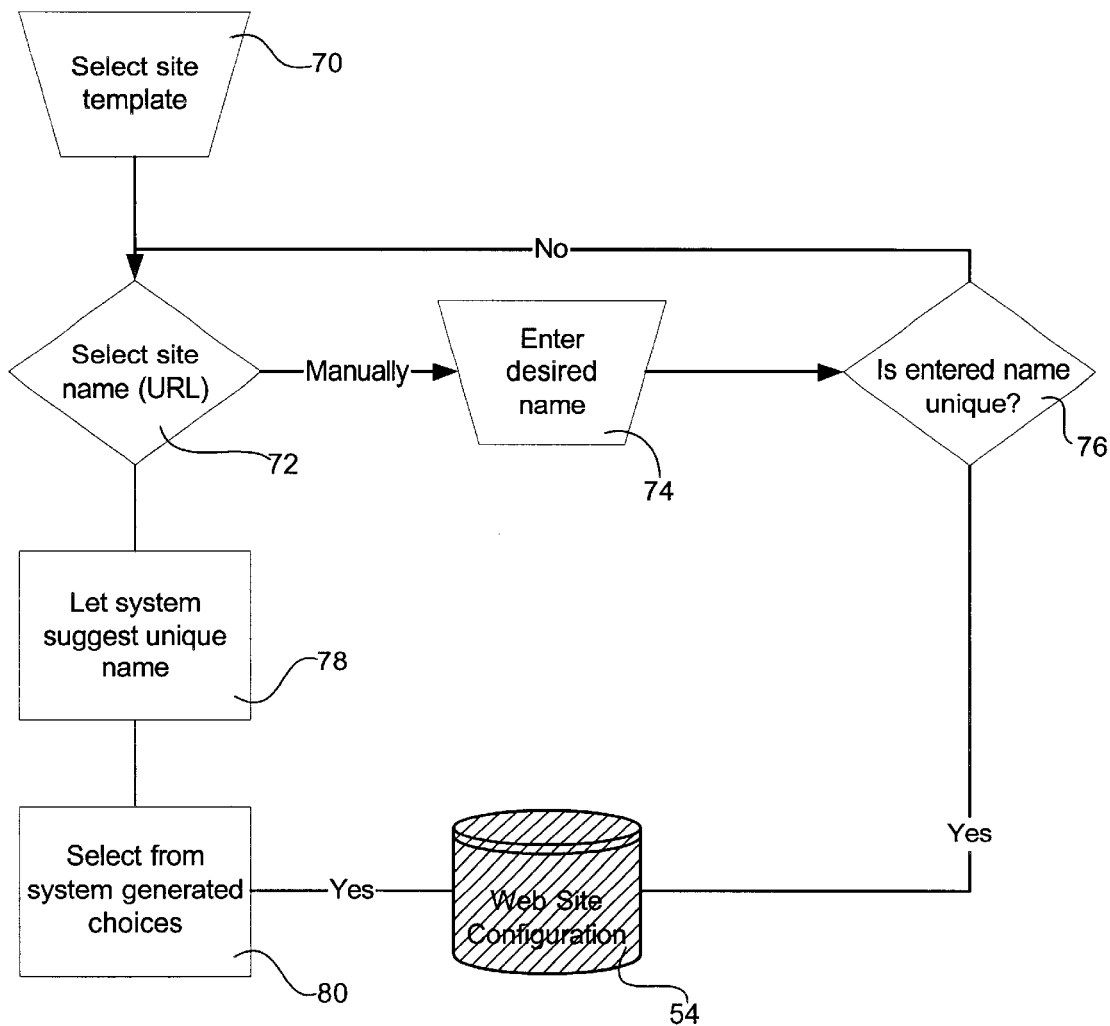
FIG. 11 is a diagram illustrating details of web site configuration.
Figure 12:
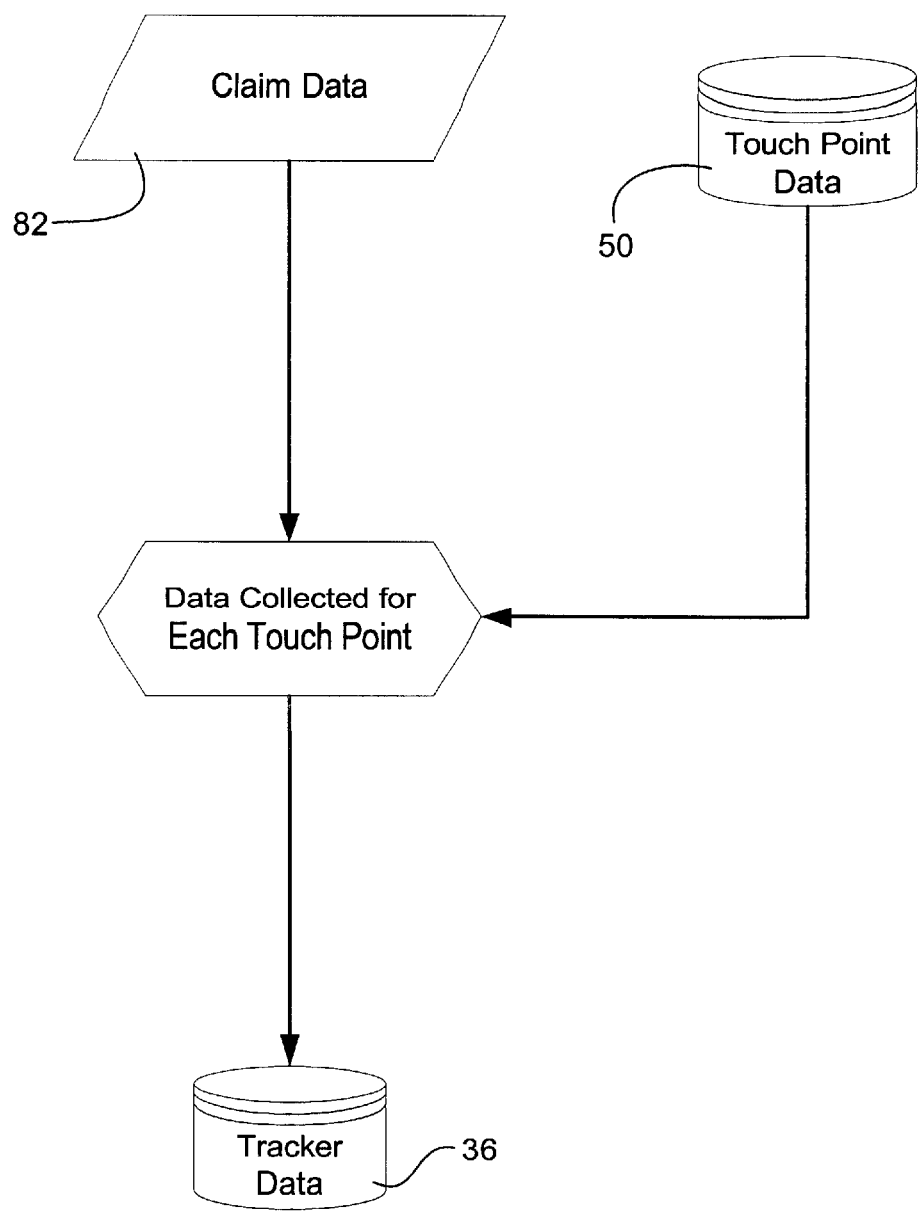
FIG. 12 is a diagram illustrating details of tracker data.
Figure 13:
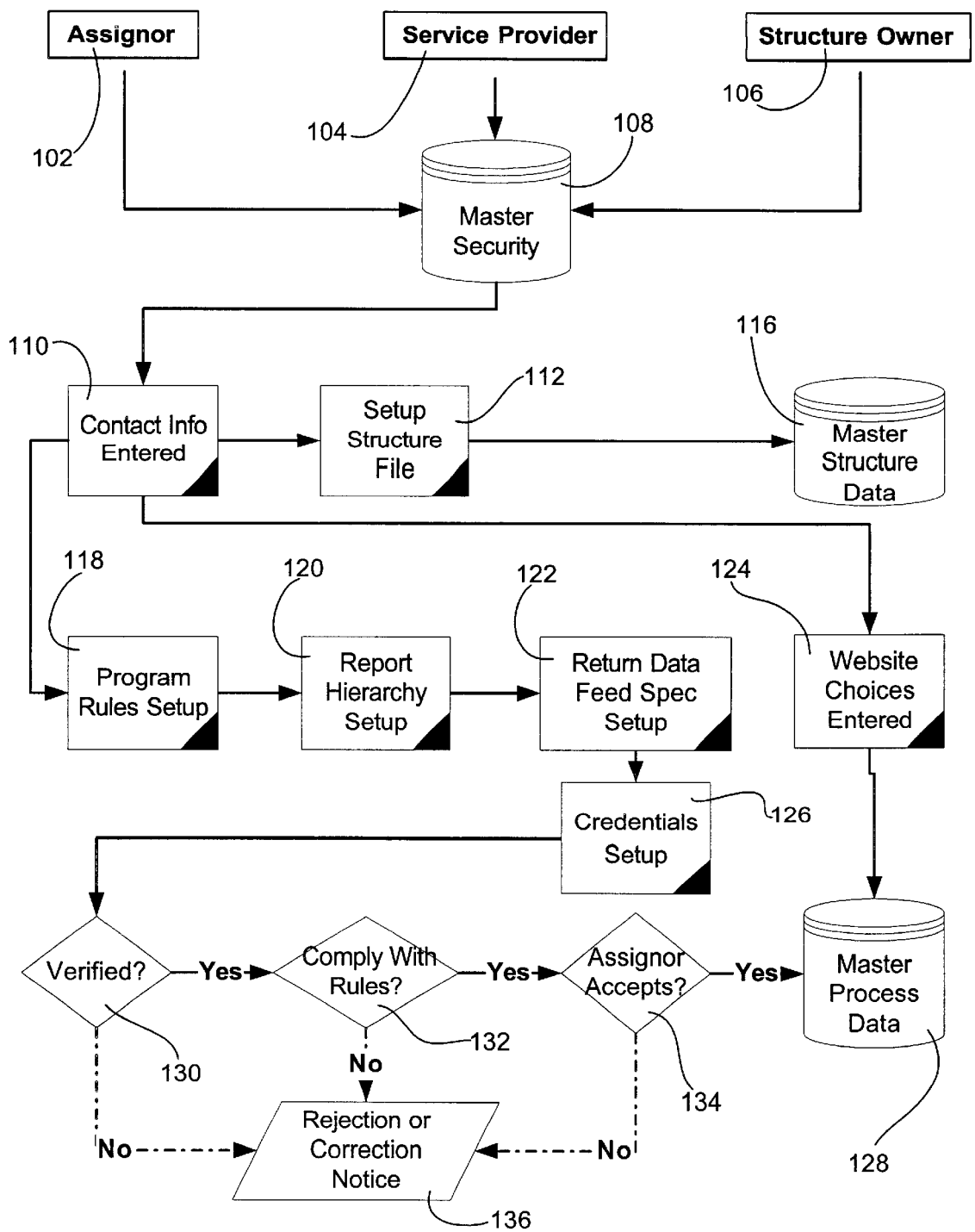
FIG. 13 is a diagram illustrating details of an information setup procedure data.

Some embodiments of the present invention may also comprise web site configuration 54 as part of master process data 40, shown in FIG. 6. Web site configuration information 54, as shown in FIG. 11, may allow a user to select a pre-formatted site template 70 which is suited to reflect information desired by a user. A user may also select a network address or URL for a site 72. The URL may be input manually 74. As conflicts may occur, the system of embodiments of the present invention may verify 76 that the selected URL is not in conflict with previously established URLs. A user may also allow the system to suggest one or more non-conflicting URLs 78 and select from the system generated choices 80. Once a site is configured, a user may visit the site to obtain the desired data.

Master process data 40 may also comprise tracker data 36 in some embodiments, as mentioned above. In reference to FIG. 12, tracker data 36 comprises data acquired from initial claim input 82 such as the time and date of the claim filing, acceptance and other processing. Tracker data 36 may also comprise information retrieved from touch point data 50 which has been gathered by the touch point processes of the particular embodiment of the present invention in use. As mentioned above, tracker data 36 may be used as a comparison standard to evaluate service provider performance. Tracker data 36 may also be used for report generation and other uses.

Use of embodiments of the present invention requires initial setup and configuration to initialize and populate the various databases and/or other information storage resources. In reference to FIG. 13, an information setup procedure 100 is described for a preferred embodiment of the present invention.

Preferred embodiments of the present invention will provide organizational and informational benefits to assignors 102, service providers 104 and structure owners 106. Assignors 102 may include, without limitation, insurance companies, warrantors, or other parties which carry some liability for maintenance, repair or other task completion. Service providers 104 may include, without limitation, painters, plumbers, electricians, masons, water and smoke damage mitigators, mechanics and almost any other type of contractor, repairman or maintenance or service provider. Service providers 104 may also include suppliers of goods and materials. Structure owners 106 may comprise any person with an interest in a structure. It should be noted that a structure owner 106 may also be an assignor 102. This would be the case, for example, when a building owner 106 needs a service performed for which there is no warranty or insurance coverage. In this case, owner 106 would act as assignor 102 by assigning the task and compensating the service provider 104.

Multiple assignors 102, service providers 104 and owners 106 may be input for a given structure or multiple structures. All information for assignors 102, service providers 104 and owners 106 need not be input during initial information setup 100, however more functions of embodiments of the present invention will be enabled when complete information is provided.

Information input from assignors 102, service providers 104 and owners 106 is directed through master security 108 which controls and limits access to information. Master security 108 limits access to parties with approved user IDs and passwords. Once a party has gained access to the system, that party is limited to specific information relevant to the accessing party. Accordingly, a particular user ID and password will provide only limited access to system information. Administrative or master security IDs may provide unlimited access when necessary for system administration. Sensitive information may also be encrypted for further security. Encryption techniques and protocols are designated in master security 108.

A party will generally begin information setup by designating contact information 110 as explained above in reference to FIG. 1. Once contact data 110 is input, a party may proceed with structure file setup 112. Structure file setup 112 comprises the input of information which communicates the physical characteristics of the structure and appurtenances to the structure as well as the liabilities, such as insurance policies, warranties and others, related to the structure and its appurtenances. Structure file setup 112 may comprise the input of an electronic model of the structure such as a computer-aided drafting (CAD) file. Some embodiments of the present invention include CAD functions for the creation of a CAD file. These CAD files will generally communicate accurate physical attributes of a structure, its contents and appurtenances such as physical dimensions and locations. In a preferred embodiment of the present invention, the electronic model comprises an accurate three-dimensional CAD file with icons displayed in each room or division of the structure which represent the contents of the structure. These icons may be selected to view information regarding structure contents such as manufacturer, warranty data, insurance data and other information. Information related to structure contents may also be input at any time after structure file setup 112.

Once structure file setup 112 is complete, this structure information is compiled and stored as master structure data 116. This data may be remotely accessed later by the owner and service providers or others who need accurate structure information. In a preferred embodiment, master structure data 116 will be connected to the Internet thereby allowing remote access by interested parties, such as service providers, who wish to perform estimates or bid on projects which have been identified by the owner or assignor.

Information setup may also comprise program rule setup 1118 wherein a party may select or create rules, such as process rules 42, as shown in FIG. 8, which may govern the execution of alert notices, assignment escalation, service provider selection or other functions of embodiments of the present invention. Rules may be set up by assignors 102, service providers 104, owners 106, administrators or other parties with an interest in the structure, its contents and appurtenances or an associated task.

A user may also define a report hierarchy 120 during the information set up process 100. This is typically done by an assignor 102 who will receive reports as a task progresses, however, other parties may also receive reports and establish report hierarchies. During report hierarchy set up 120, a party will define a number of hierarchy levels and may designate standard or custom report formats and schedules for each level. Common hierarchy levels include, but are not limited to, branch offices, company headquarters, regions, states, countries and individual representatives. The relationships between hierarchy levels may also be established during this set up phase.

Embodiments of the present invention may also output data directly to a participating party through various communication connections. Return data feed setup 122 may also be designated during information setup 100. In return data feed setup 122, a user establishes whether a direct data feed is desired. If desired, a user may choose the communication method and protocol to be used. Common methods currently being used include, but are not limited to, FTP, Push/Pull from secure web site, Winsock application over secure line, such as a value added network line (VAN) and others. A user will also designate a data type and format which may include electronic image files such as JPEG, GIF, and others, custom data file formats, proprietary data formats or other information configurations.

If a user chooses to receive information through the Internet via the World Wide Web (WWW), the user may wish to set up a dedicated web site to receive this information. When this is the case, a user may perform website setup 124 during information setup 100 or at another time. In website setup 124, a user will designate a unique Internet address or URL for an information retrieval web site. A user may also define web site parameters to configure the site for the specific information to be received. Information may be received in any standard graphics or text format or custom data formats depending on user preference. Embodiments of the present invention will transmit data to selected web sites or URLs through standard communication techniques.

Information setup 100 also comprises credential setup 126 wherein service provider information may be entered and stored in the system of the present invention. This information may be entered for individuals as well as service companies and suppliers of goods. Typically, a service provider, or another party, will provide contact information and preferences 110 before providing credential data, however these may be performed at essentially the same time. In credential setup, a party will enter available credential data 20 for a service provider including perishable and permanent certificates 22 as well as verification information 24. Information regarding agreements and terms 28 may also be input as well as initial quality rating information. Credential data 20 may be text data input from a keyboard or data file transfer or may be graphical data such as scanned certificates and documents. Agreement and term data 28 may comprise agreements between a service provider 104 and assignor 102 which qualify a service provider to perform work for which an assignor is liable to pay. In an example with an insurance company as assignor, this information may be used to qualify a service provider 104 to perform work covered under insurance policies held by the owner 106.

When a particular task has been defined and a service provider has been given an initial assignment, the service provider's credentials will be verified 130 to determine compliance with any rules regarding service provider qualifications. If these requirements are met, the service provider will proceed with initial contact with the structure owner and generate cost estimates. These initial contact and estimation events must be performed according to rules 132 established by the interested parties or a service provider may be rejected 136. Alternatively, to avoid a rejection, a service provider may correct a rule violation 136. If all rules are complied with or violations corrected, a service provider will be authorized to complete the task according to other established process rules 134. Master process data 128 may contain these further rules of compliance. Rule compliance will continue to be monitored by the systems and methods of embodiments of the present invention.

The processes of preferred embodiments of the present invention may be better understood through an example in which the assignor is an insurance company and an embodiment of the present invention is used to process claims against insurance policies.

Figure 14:
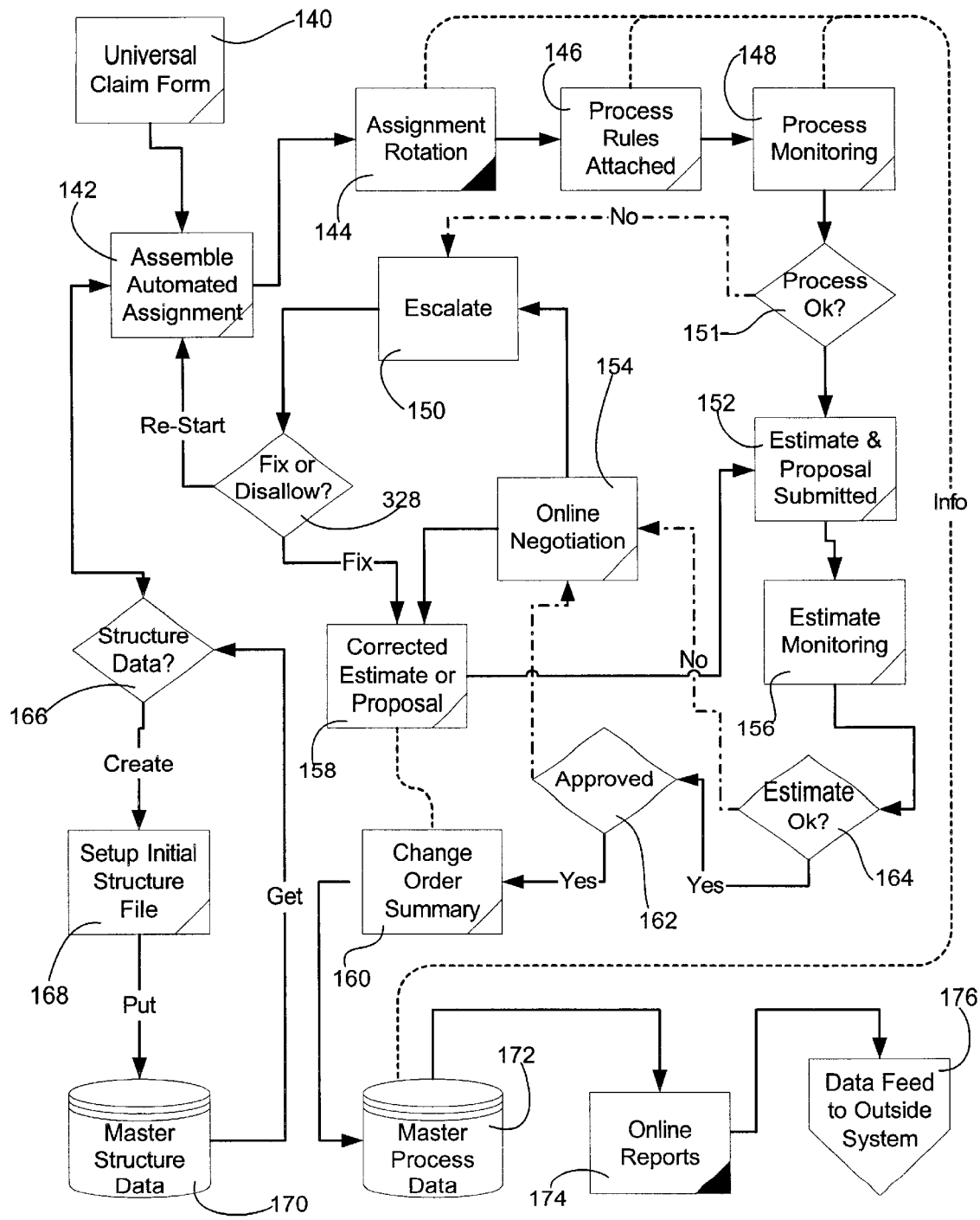
FIG. 14 is a diagram illustrating details of exemplary processing methods.

In reference to FIG. 14 and subsequent figures, a policy holder or owner would initiate claim processing and task assignment by filling out a universal claim form 140 which, in preferred embodiments would comprise an Internet-based web form with input fields for required claim data. An interactive data input form may be used to determine the extent and type of claim data required for a specific claim. In other embodiments, an owner may communicate with an agent or other representative who may fill out the form or use another software package to supply a formatted data stream which would achieve the same function as the form input.

Figure 15:
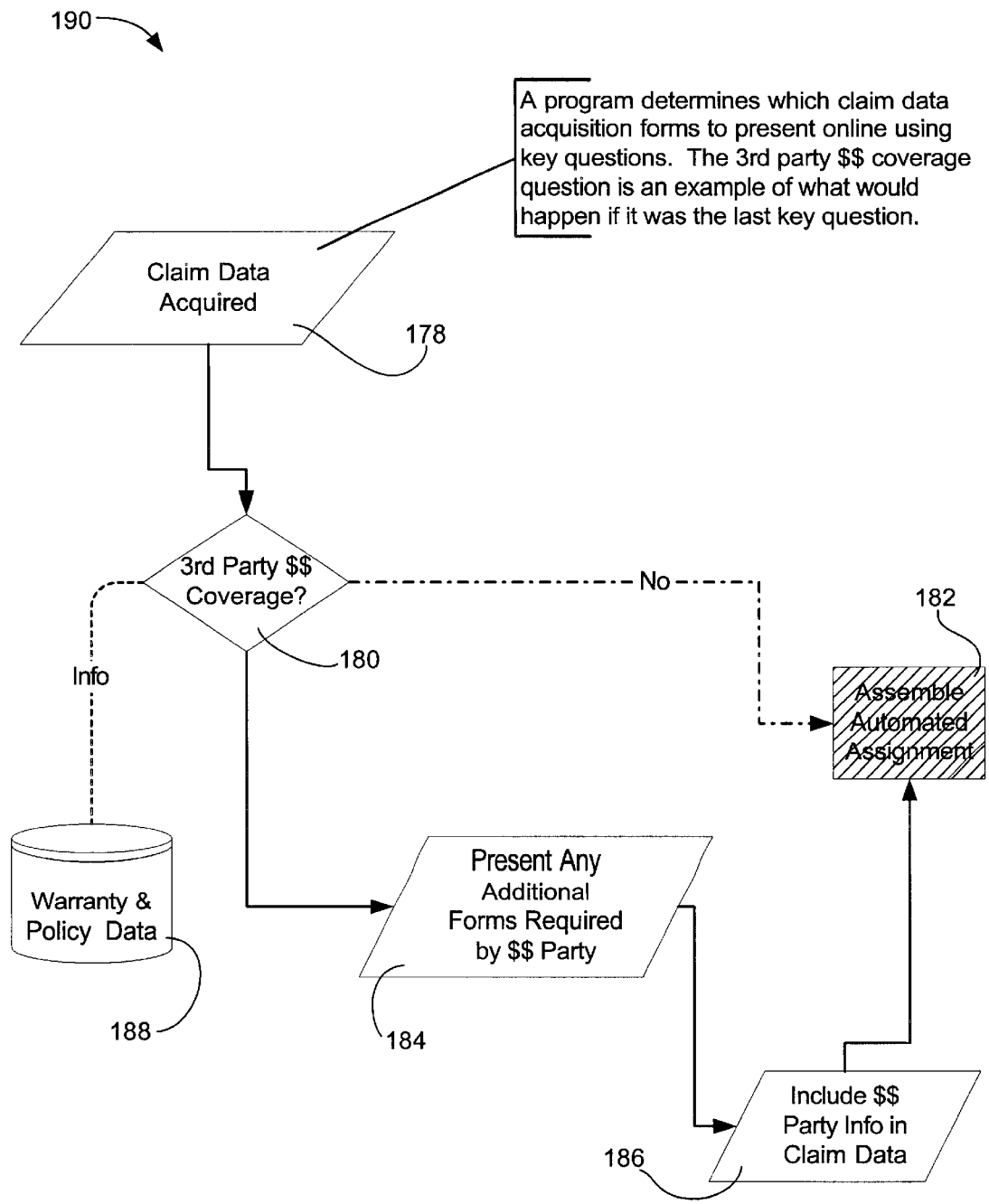
FIG. 15 is a diagram illustrating details of task data acquisition and assignment.

Regardless of the data input method, once the claim data is input, the automatic processing of these embodiments may commence. After initial claim data has been input, additional information may be requested to determine policy coverage parameters. For example and not by way of limitation, the system may request information about third party coverage under additional policies or warranties 180, as shown in FIG. 15. Some of this additional information may be entered manually by prompting a user, however, in a preferred embodiment, warranty and policy information 188 will be stored in the system for automatic access. This information will generally be stored for a structure, its contents and its occupants. When this is the case, third party coverage request 180 will be automated and transparent to the user. When third party coverage exists, additional forms or information requests required by a participating third party may be presented 184. When all initial claim data has been acquired, the coverage data is merged with the claim data 186 and the claim proceeds to automated assignment 142 as shown in FIG. 14.

Figure 16:
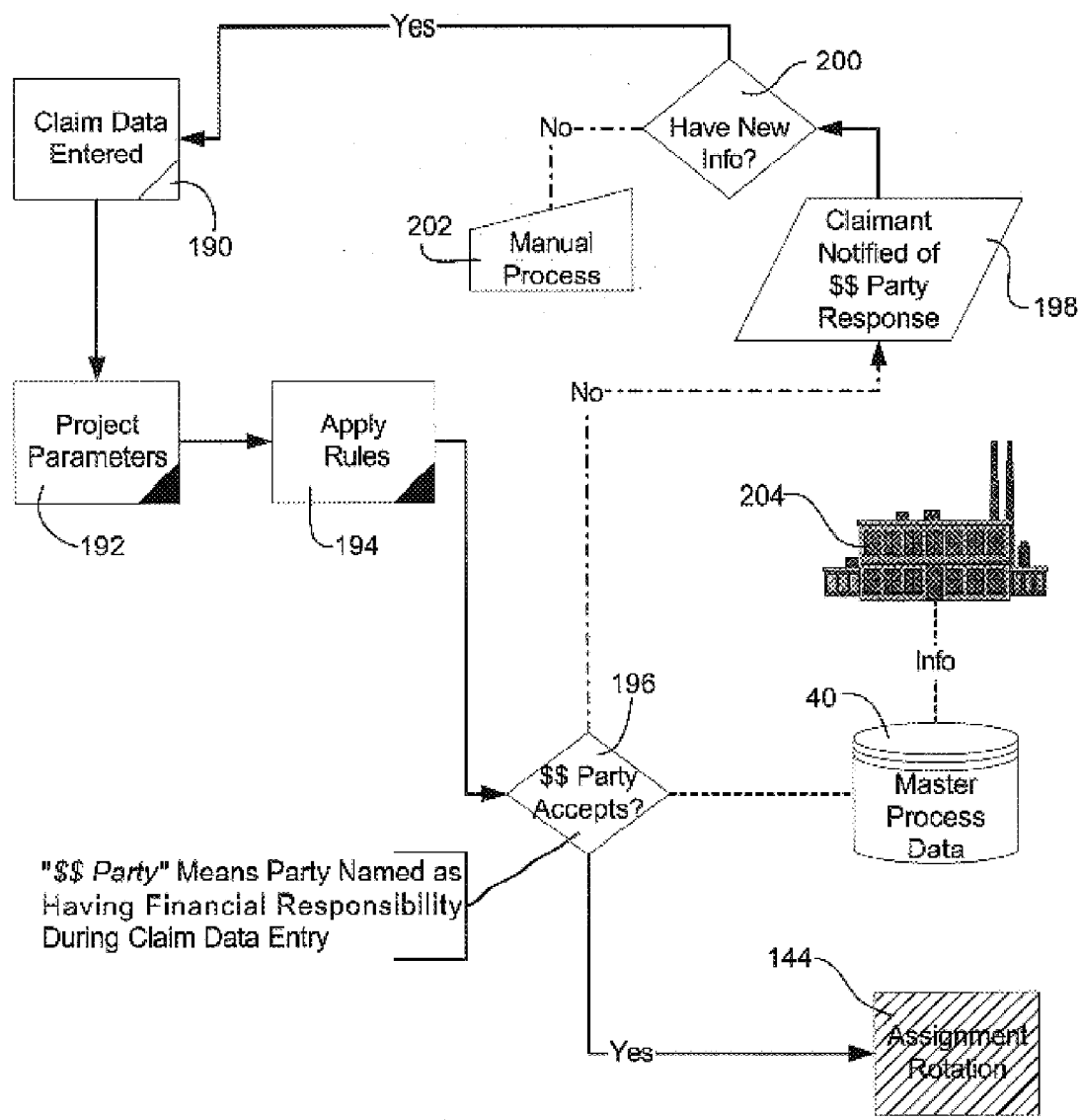
FIG. 16 is a diagram illustrating details of an automated assignment method.

Details of the automated assignment process are illustrated in FIG. 16 where, once claim data is entered 190, project parameters 192 are defined. To determine the project parameters 192 associated with a claim, the claim data is analyzed to determine the particular type of loss, such as a malfunctioning appliance under warranty, flood damage to a residence, fire damage, earthquake damage or some other loss. The approximate amount of the loss may also be determined. The geographical area in which the loss has occurred may also be a project parameter. When initial project parameters have been established, process rules 42, which have been defined during the information setup stage 100, may be applied to determine how further claim processing will take place.

Figure 17:
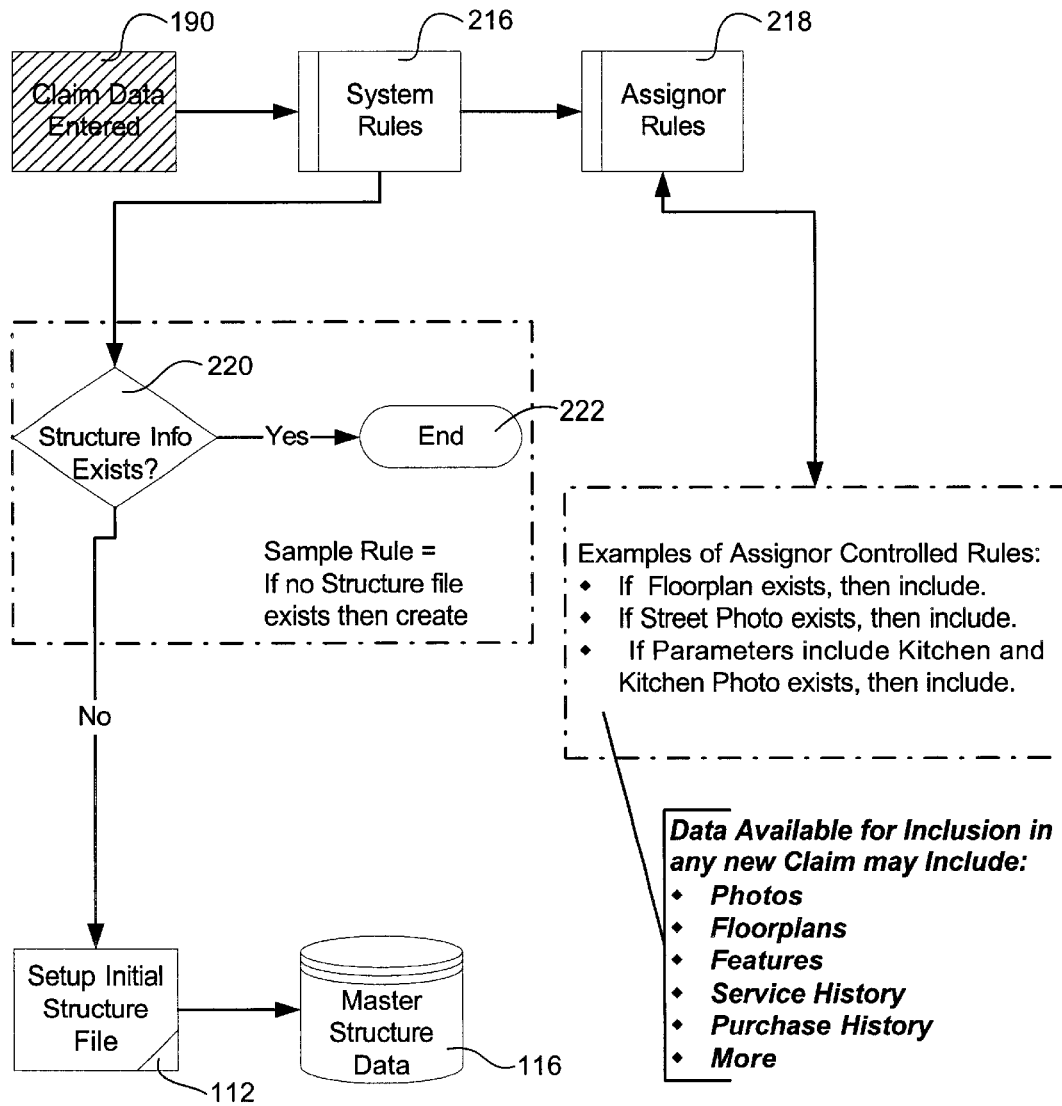
FIG. 17 is a diagram illustrating details of system and assignor rules.

Among these rules are system rules 216, as shown in FIG. 17. System rules 216 are established by a system administrator to handle variables and options available in embodiments of the present invention. For example, and not by way of limitation, a system rule might account for the use of an optional structure file or portion of a structure file 220. If a structure file exists, the system will access that file for structure information 222. If no file exists, the system may direct a user to initial structure file setup 112 to set up master structure data 116. Assignor rules 218 are also applied to claim data and project parameters 192. These rules, established by an assignor, may limit assignor liability, project scope, project budget or other factors. They may also trigger notices to an owner indicating that certain project items may not be covered by a given policy or warranty. They may also regulate the information retrieved from a structure file. For example, they may direct the system to retrieve stored photographic images of a particular portion of a structure when that portion is included in the scope of a project. They may also regulate the use of structure model data such as floor plans or structure features. Service history, purchase history and other data items may also be accessed to further define project parameters and facilitate automated assignment.

In further reference to FIG. 16, an assignor or other party with financial responsibility for a project will be given a project acceptance option 196 once the project parameters 192 have been defined and appropriate rules applied 194. If the financially responsible party does not accept, the claimant may be notified 198. Claimant, then, has the option to opt out of the automated process 202 or make changes to the project 200 and enter new information. New information may comprise assumption of some financial liability by the claimant, downsizing project scope or other modifications. If the financially responsible party accepts the project as defined, the project will proceed to assignment rotation 144. Master process data 40 and other information resources 204 may be automatically accessed to determine automated acceptance or notification procedures as well as other processing.

Assignment rotation 144, as shown in FIG. 14, is described in more detail with reference to FIG. 18. During assignment rotation 144, service provider and assignment matching 226 occurs. Credential data 20 and program rule data 42 are accessed to determine which service providers are qualified to perform the project.

Figure 19:
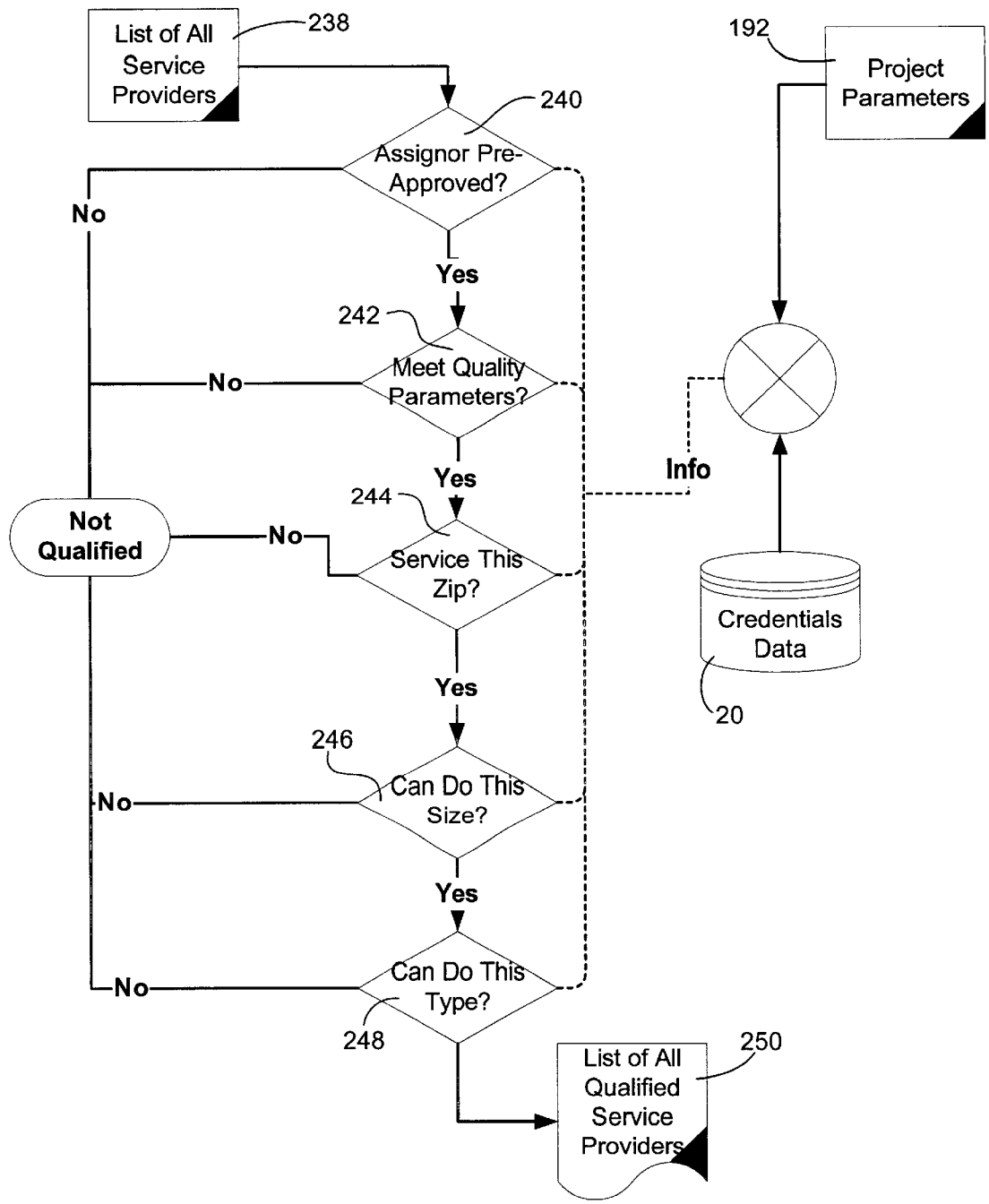
FIG. 19 is a diagram illustrating details of service provider selection.

Matching 226 is illustrated in FIG. 19, wherein a list of all service providers 238 is filtered to find a service provider qualified to perform the project at hand. The list of service providers 238 will generally be compiled from providers found through an on-line registration program, research of advertising and public documents, suggestions from assignors and owners and through other methods. This list 238 will then be stored in the system for access and filtering for specific projects.

The example parameters for filtering the list shown in FIG. 19 are merely exemplary and are not to be construed as limiting the scope of the present invention. In this example, the list 238 is first filtered to remove any service providers which are not pre-approved by the particular assignor 240 associated with the project. Quality parameters 242 are then evaluated to remove any service provider which have received poor quality ratings or complaints. The geographical location of the service provider may also be evaluated, as by zip code 244 in this example, to determine if the service provider is in close enough proximity to complete the project without undue travel expenses and mobilization costs. The ability of the service provider to accomplish a project of the same magnitude as the proposed project 246 may also be considered in filtering the list. Finally, the type of work involved in the proposed project is matched to the service provider's known scope of experience 248 to filter the list of candidates. After filtering according to these parameters, a list of qualified service providers 250 is generated for further selection.

Figure 20:
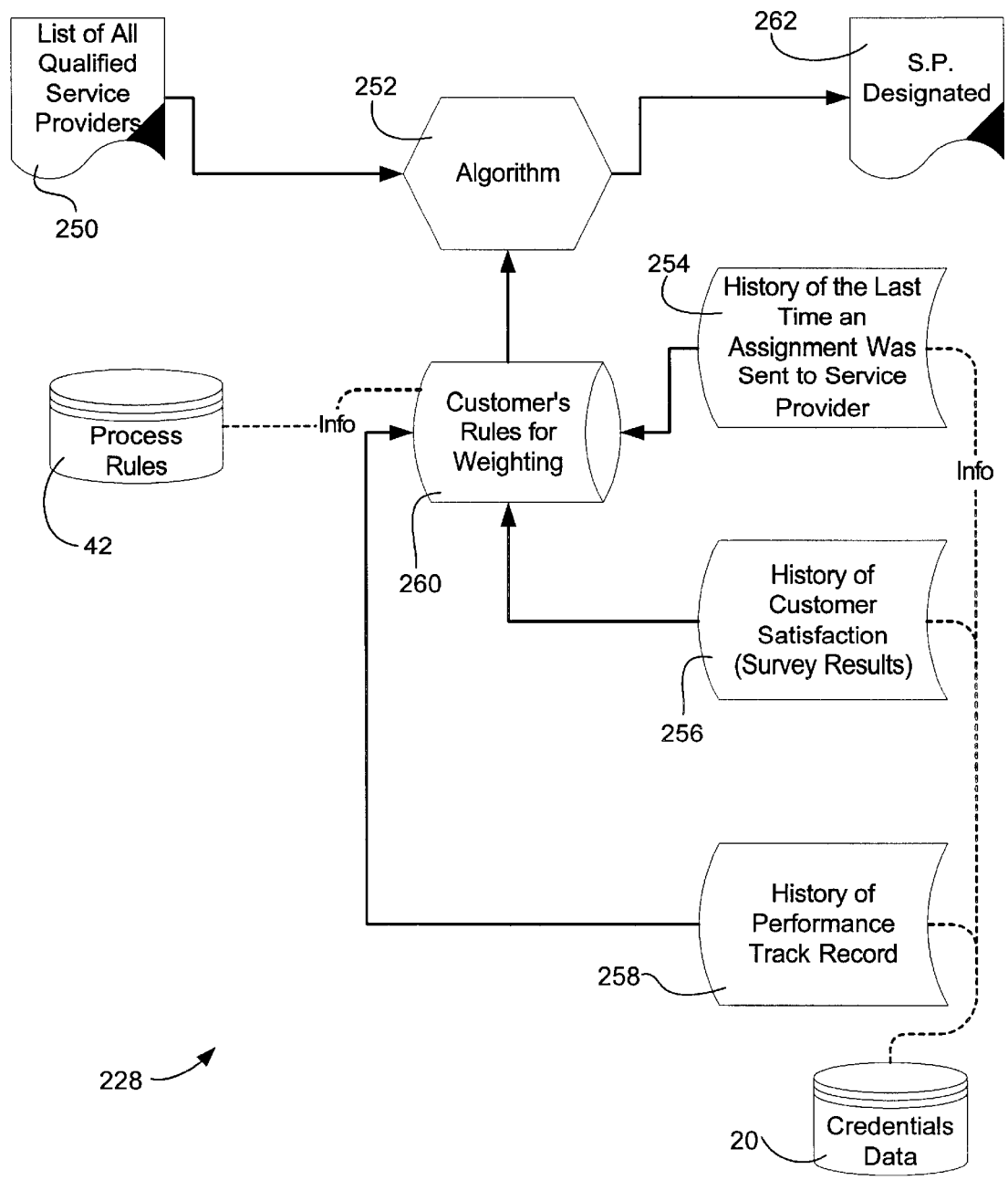
FIG. 20 is a diagram illustrating details of service provider selection.

The list of qualified service providers 250 is further prioritized through a turn sequencing process 228 shown in detail in FIG. 20. Process rules 42 are accessed to determine owner and assignor limitations 260 on service provider selection. These rules are applied to data stored in credential data 20 related to times and dates of prior service provider assignments 254, the customer satisfaction history of a service provider 256, the performance track record 258 of a service provider and other data relevant to a service provider's work record and qualifications. These rules are enacted through an algorithm 252 which is applied to filter the qualified list 250 and make an initial selection 262 of a single service provider to which the project may be assigned. A ranked list of alternate service providers may also be generated.

Figure 18:
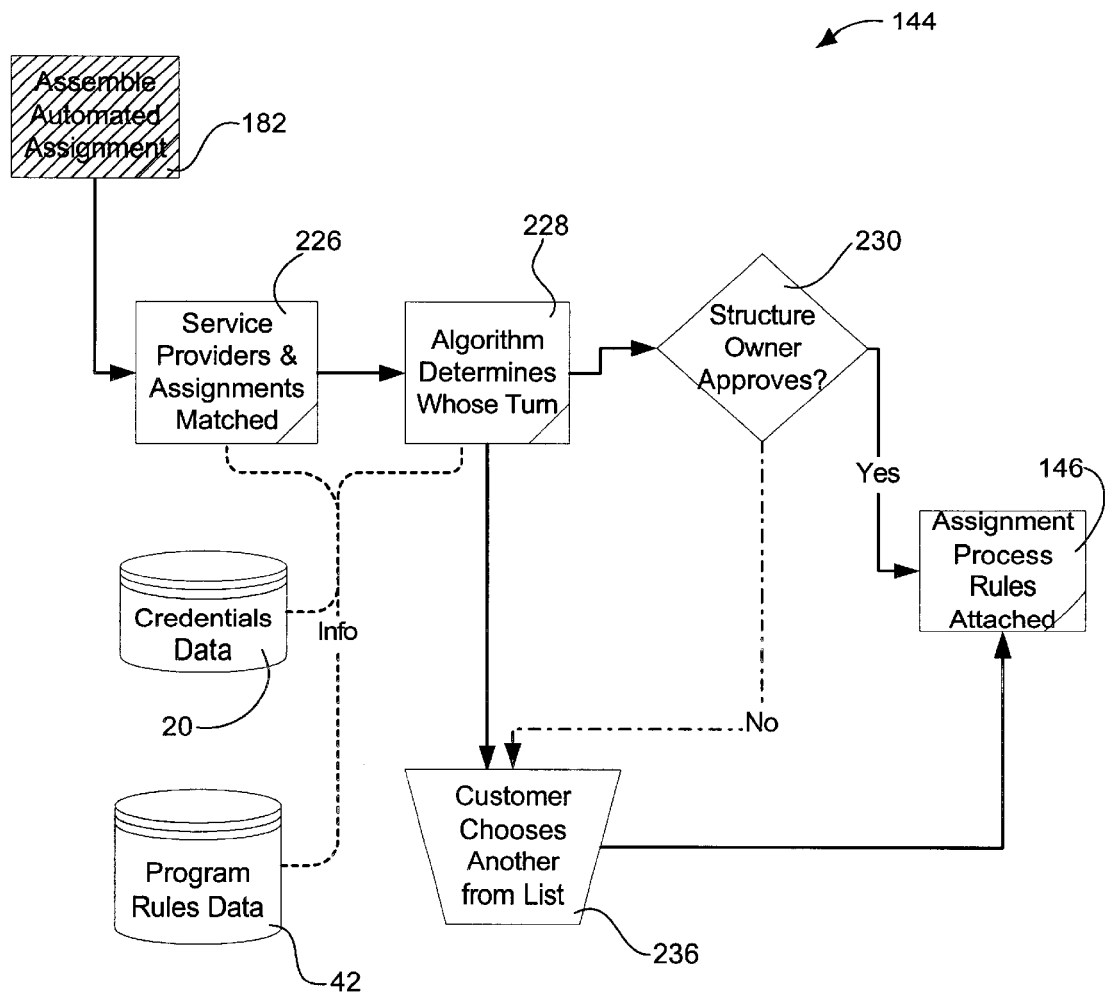
FIG. 18 is a diagram illustrating details of assignments and rotation.

After initial selection 262 is made through process 228, shown on FIG. 18, the selected service provider is proposed to the structure owner for approval 230. If the owner does not approve of the initial selection, the owner may choose another service provider from the list of alternates 236. When the owner approves of a service provider selection, process rules 42 which apply to project execution are attached to the project 146 and the project is assigned to the selected service provider. These rules will dictate requirements to which a service provider must adhere during project execution. Service provider progress is monitored 148 during project execution to determine compliance with rules. If a rule violation is detected 324 during process monitoring 148 an assignor, owner or other party will be notified of the violation and the service provider's performance record or quality rating may be adjusted accordingly.

Figure 21:
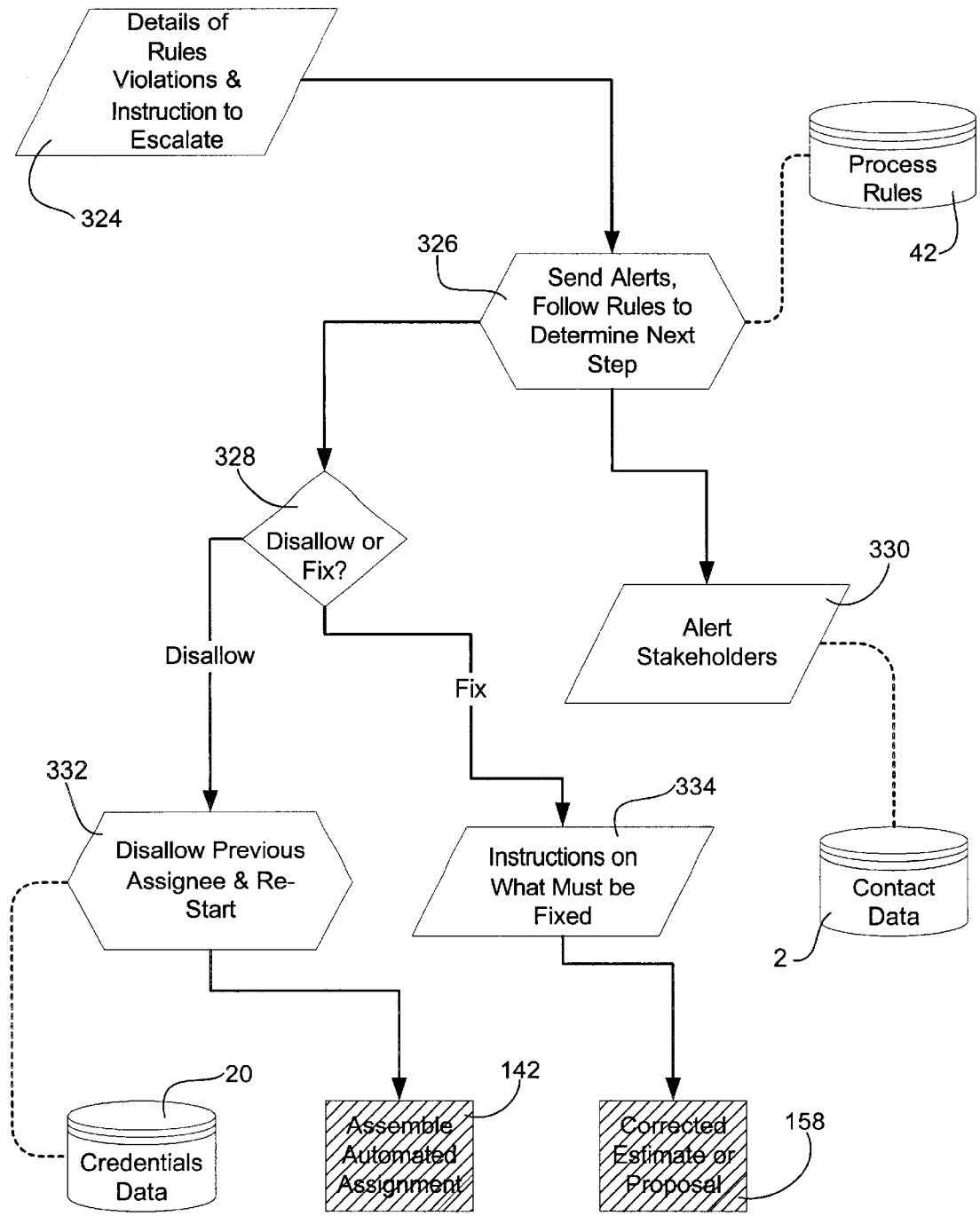
FIG. 21 is a diagram illustrating details of rules execution.

In reference to FIGS. 14 and 21, significant rule violations 151 during initial project steps will trigger an escalation procedure 150. Depending on the particular violation and the process rules 42 established for the project 324, alerts or other notification 326 will be communicated to inform parties of the violation. Automated alerts may be communicated to stakeholders or other parties 330 based on the contact information stored in contact data 2. If the violation can be remedied to the satisfaction of the interested parties 328, remedial instructions will be issued 334 and a corrected estimate or proposal 158 will be generated. When the violation cannot be remedied, the assignment will be disallowed 332 and a new automated assignment process will begin 142.

Figure 22:
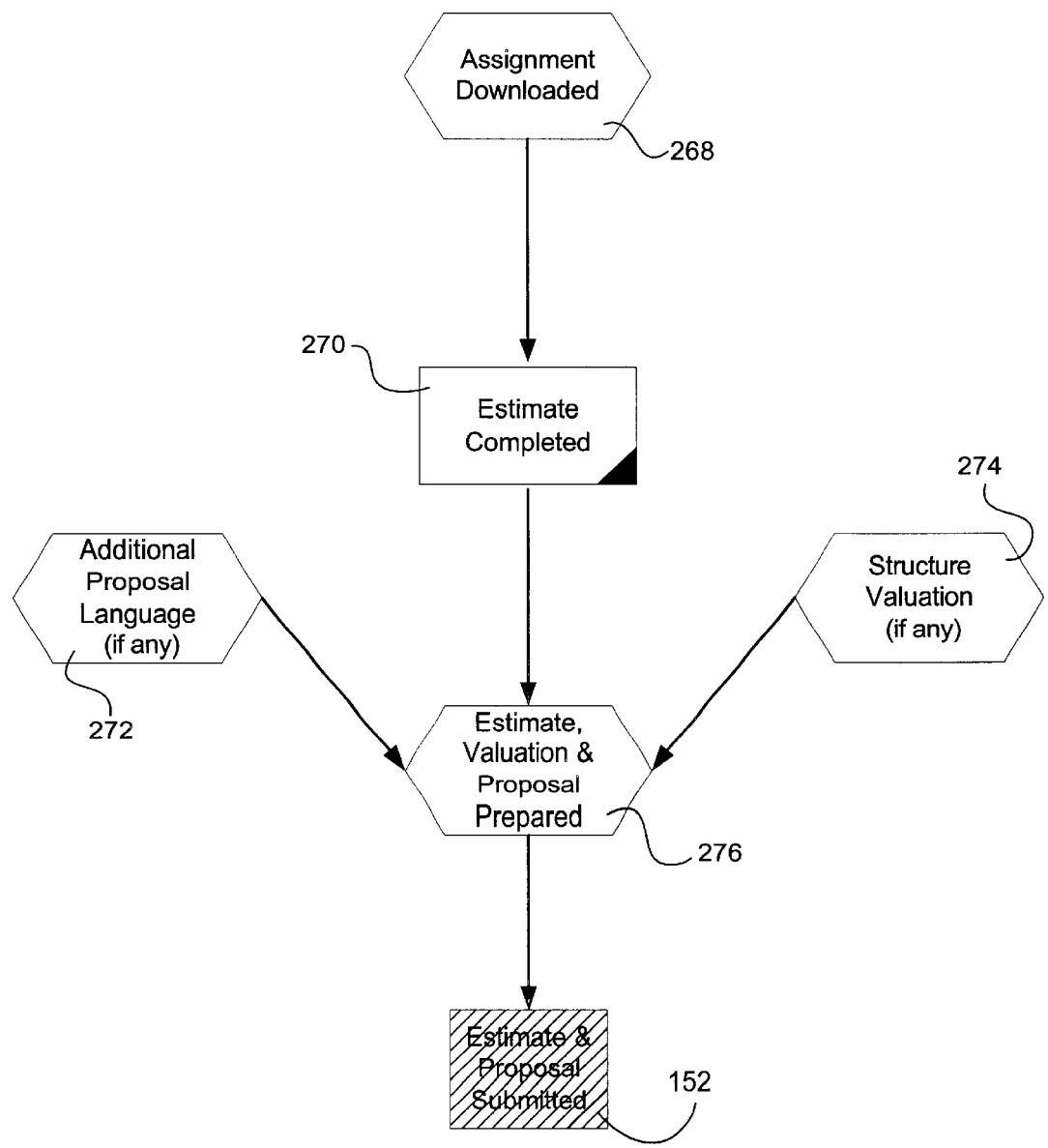
FIG. 22 is a diagram illustrating details of an estimation and proposal process.

Process rules 42 will generally direct a service provider to perform an initial owner contact and interview or site survey prior to making a project estimate. If the initial contact process proceeds without significant rule violations 151 (FIG. 14), an estimate will be prepared by the service provider 270, as illustrated in FIG. 22. The estimate may be augmented with additional proposal language 272 to modify the project description, if necessary, after a site visit. Structure valuation data 274 may also be combined with estimate 270 so that an assignor may make any judgements based on structure value such as repair vs. replacement decisions.

Figure 23:
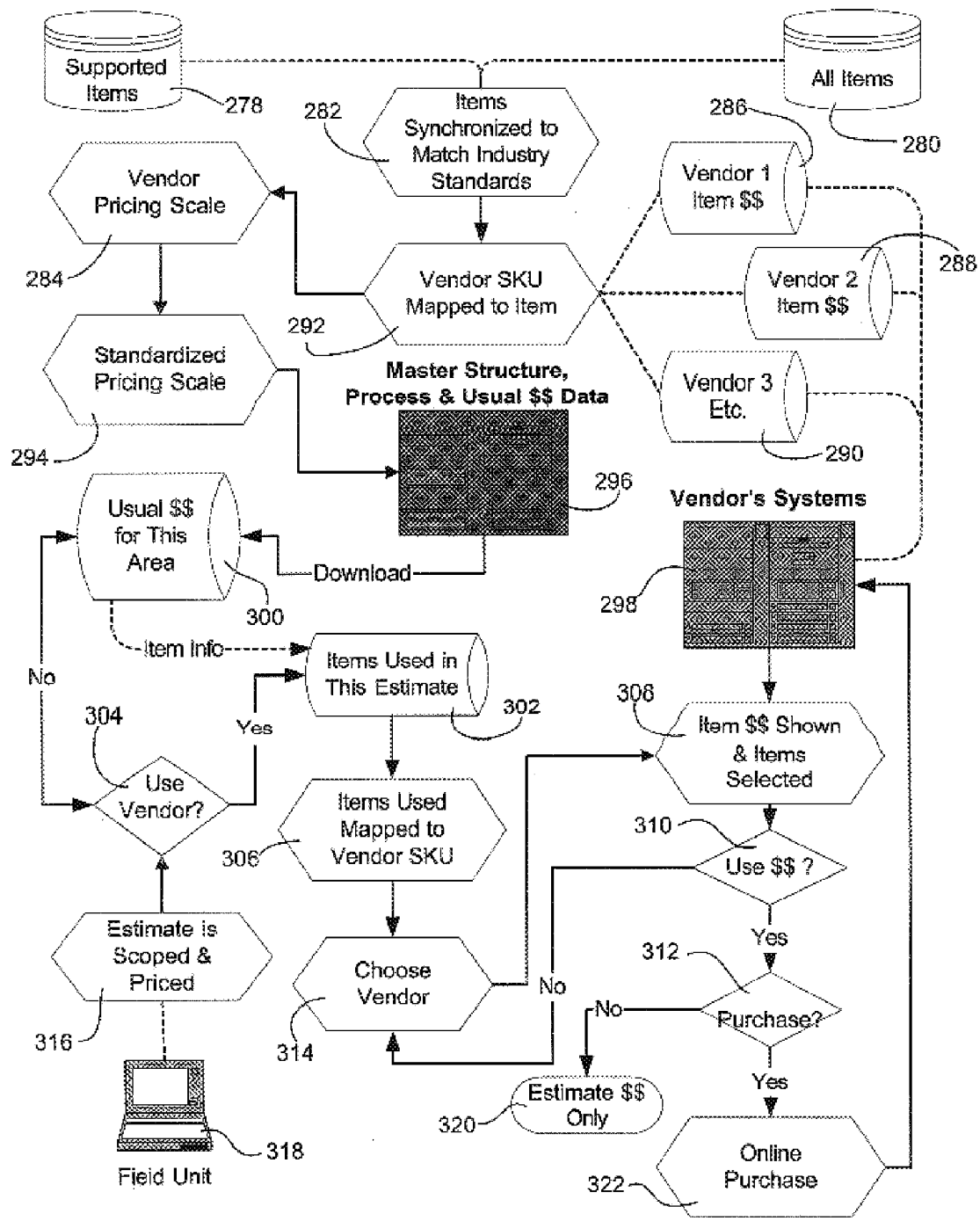
FIG. 23 is a diagram illustrating details of an estimation, pricing and purchasing process.

Estimate 270 may be prepared using an automated, on-line estimation process of some embodiments of the present invention explained with reference to FIG. 23. Typically, a database comprising all significant goods and services 280 needed for a particular task area is maintained. These goods and services are stored along with cost information so that a cost estimate can be generated. Items among goods and services 280 which have been specially selected for their superior or exemplary attributes such as warranties, certifications or other qualities are stored in a database of supported items 278. In some embodiments of the estimation system, items within these databases are synchronized to match industry standards 282 by correlating equivalent products or services.

Vendor information 286, 288 and 290 is made available from several vendors so that each item can be mapped to a particular vendor SKU identification 292. Vendor pricing schedules 284 which may be related to particular outlets or geographical regions are also compiled for items within the systems of these embodiments. A standardized pricing schedule 294 may also be used for rough estimation purposes or for comparison with vendor data 284.

The estimation systems of these embodiments may be accessed from a remote computer 318 comprising software of embodiments of the present invention which allows a service provider's estimate to be scoped and priced 316 in a standard format for analysis and comparison with system data. A user may select whether to use vendor pricing or standardized pricing 304 for the estimation process. If vendor data is not selected, a standardized pricing schedule is used for estimation purposes 300. This schedule may be accessed remotely from remote computer 318 over a network, Internet or dial up connection or the data may be downloaded from master data 296 to the remote computer where the estimation processes will be executed.

If vendor data is selected 304, item quantities in the estimate 302 are mapped to vendor SKU codes 306 so that actual vendor prices may be related to each item. Prices may be calculated and displayed for several vendors and a user may select a specific vendor 314 and specific items 308 from that vendor's selection. Alternatively, a user may allow embodiments of the present invention to automatically select 314 a vendor for each item according to designated parameters such as lowest price, lowest price for a specific brand or other parameters.

When a final estimate amount is accepted 310, a user is given the option to purchase the items from the participating vendors. If a purchase is desired, the purchase may be made using typical on-line purchase methods 322. If a purchase is not desired at the time of estimation, an estimate only 320 option may be selected and only the estimate results will be generated from the process.

Estimates created by the above methods may be saved and made available to interested parties. These estimates may contain specific item information including SKU identification codes, item specific pricing, item manufacturer identification, and other information which parties may review and modify to meet specific requirements.

Once this estimate and proposal are submitted 152 (FIG. 14), an estimate monitoring process 156 begins. If the estimate complies with process rules and is approved by the owner 164, the estimate will be forwarded to the assignor or other financially liable party for final approval 162. If any of these parties does not approve of the estimate, online negotiation 154 may ensue during which estimate and proposal modification or correction may take place. If online negotiation 154 is successful, a corrected estimate or proposal will be generated to reflect the agreed-upon changes made during negotiation. If online negotiation is not successful, escalation procedures may be triggered 150 and a new service provider assignment may be made 142.

During task execution and negotiation, a change order summary 160 is maintained by embodiments of the present invention. Change order summary 160 comprises a record of each version of the estimate and proposal as it transitions through the negotiation and execution processes. Change order summary 160 also keeps a record of specific changes and revisions which have been made to the estimate between versions including, but not limited to, changes in goods and services such as quantities, the total price prior to changes, the revised total price, the difference in total price and other information.

Figure 24:
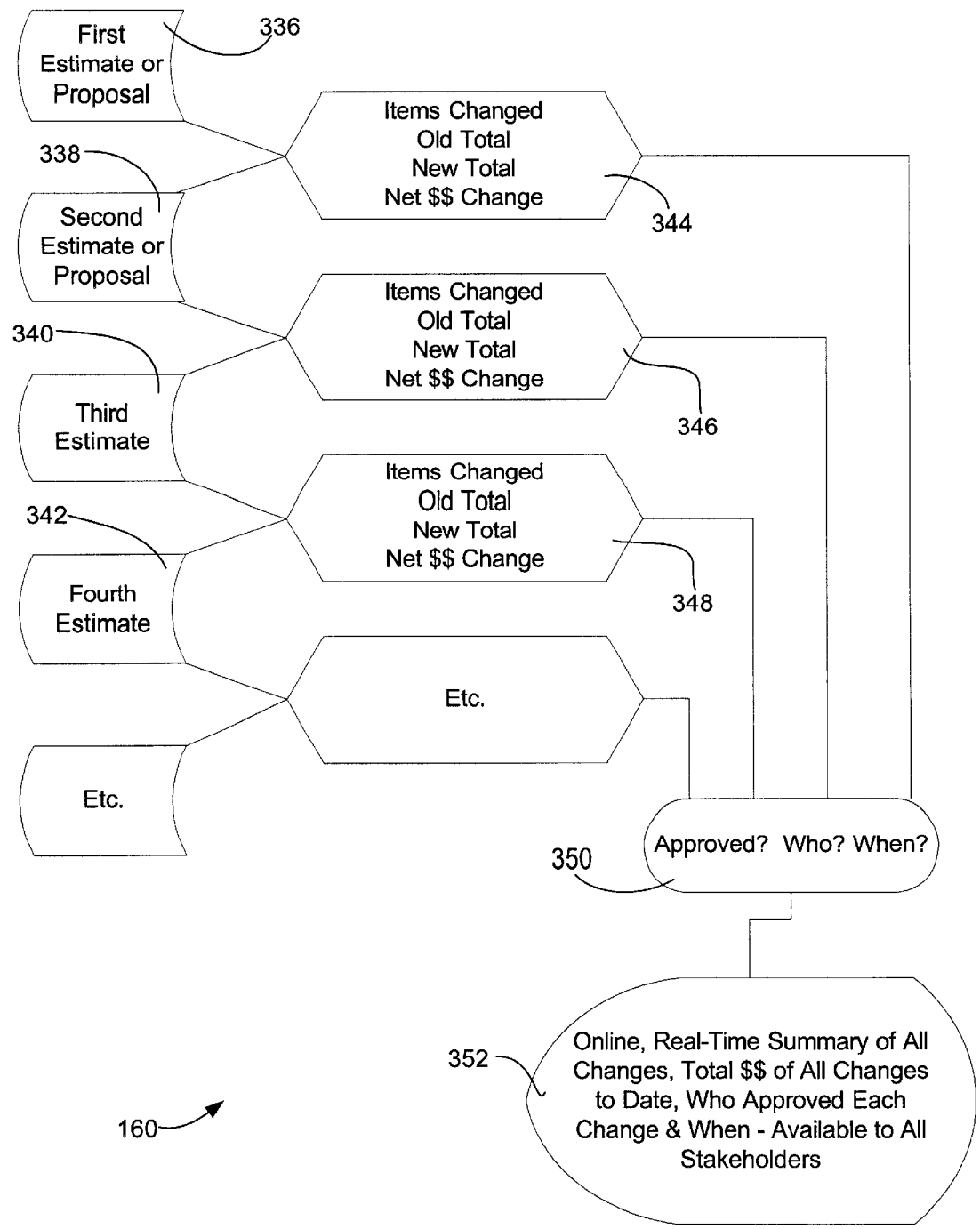
FIG. 24 is a diagram illustrating details of a change order summary process.

In reference to FIG. 24, a first estimate or proposal 336 is stored as a record. A first set of revisions 344 which have been made to the estimate during negotiations 344 is also recorded and the revised second estimate and proposal 338 is also recorded in revised form. During task execution, some problems may arise which require estimate modification. For example, and not by way of limitation, a contractor repairing a burned building may discover some previously undetected structural damage during reconstruction which must be repaired. Changes in the amount of work performed and the amount of goods used as well as the prices of all changes are recorded in revision data 346. A third estimate 340 is also generated which reflects the changes in revision data 346. Further changes may be required as work proceeds. An owner or assignor may also request changes during task execution and record these changes at revision data 348. A newly revised estimate 342 will be generated and recorded. As changes are requested, the approving authority is recorded 350 and the date and time of approval is noted. This change order summary 160 may be made available to any interested parties as a real-time updated estimate document which is accessible through an Internet site as well as other electronic and hard copy versions.

Information recorded from change order summary 160 and other task monitoring may be stored as master process data 172 for use in on-line reports 174. On-line reports may be accessed through an Internet site from which data may be downloaded 176 or data may be exported directly to client computers for further processing.

Figure 25:
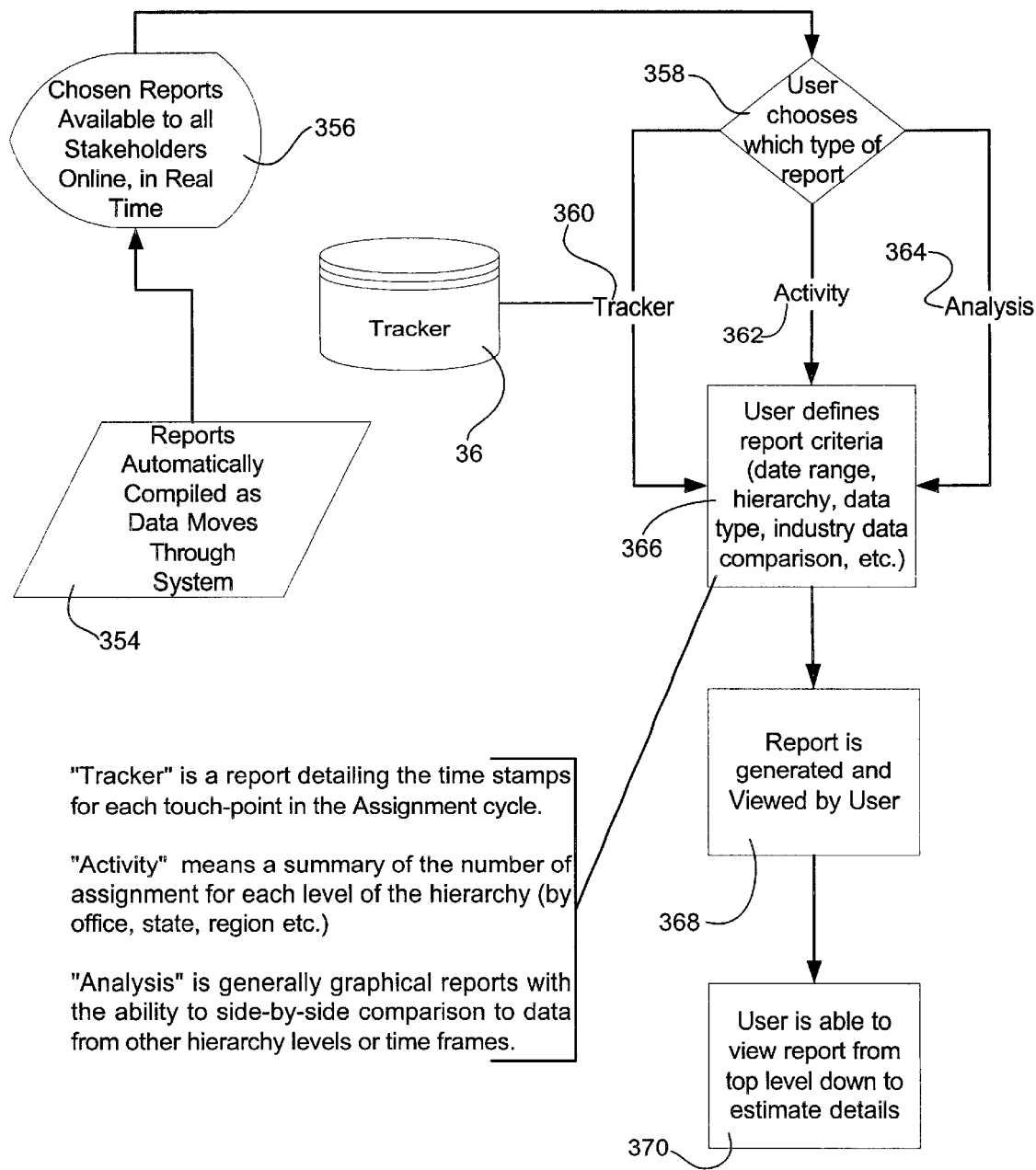
FIG. 25 is a diagram illustrating details of reports and report generation.

In a preferred embodiment, with reference to FIG. 25, customized reports may be generated automatically. These reports may be automatically compiled 354 as data is made available during the task execution and negotiation processes. Reports may be made available to all interested parties 356 which have been authorized by the assignor or owner. Typically, a user will designate the report format desired for each recipient and the data which will be included 358. Often tracker data 36 compiled from touch point data processing 50 may be compiled into tracker reports 360. Activity reports 362 which provide a summary of the number of assignments on a hierarchy level basis and analysis reports 364 containing graphical data for comparison may also be selected and compiled into a customized report format 366 with selectable criteria including date range, hierarchy, data type, industry data, data comparisons and other information.

These reports may be automatically generated and sent to a party or may be made available, such as through a web site, for access at will. A system user may also access the systems of embodiments of the present invention and generate custom reports 368 as needed. Reports may be configured to reveal data from a top level overview down to specific estimate details 370.

Embodiments of the present invention will allow a user to select both textual and graphical report formats. Textual reports which are commonly used by assignors and service providers in the insurance and building construction industry include, but are not limited to: average value reports, contractor response time reports, contractor volume reports, contractor utilization reports, price comparison reports, loss value range reports, policy number listings, type of loss summaries, unit price deviation reports, value range reports and zip code related reports. Graphical reports allow a user to compare multiple data sets and commonly include, but are not limited to: estimate/price list differences, estimate inclusion issues, estimate items not in a price list, estimate items by quality, estimate scoping overlap, estimate tax usage, estimate type of loss by dollar value, estimate type of loss by percentage, estimate minimum usage, estimate subroom usage, percentage breakdown of estimate by trade, average depreciation by trade, estimate depreciation usage, estimate overhead and profit usage, price list alignment and price list comparison. Other report formats and data sets are available through the report customization methods of embodiments of the present invention.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

I claim:

1. A method for selectively assigning third party professional tasks to independent contractors and other third party service providers, the method comprising steps for:
   electronically receiving a request from a third party for performance of a building construction or maintenance task;
   automatically associating the performance of the building construction or maintenance task with a first independent contractor based on:
      (i) task type;
      (ii) experience level of the first independent contractor to perform this type of task;
      (iii) a dependability or quality rating of the first independent contractor in performing building construction or maintenance tasks for third parties;
      (iv) availability of the first independent contractor; and
      (v) physical proximity of the first independent contractor relative to the job site;
   automatically initiating contact with the first independent contractor to request the performance of the building construction or maintenance task;
   if a response to the contact with the first independent contractor is not received within pre-established limits, performing at least one of the steps for:
      automatically notifying a quality control agent of the first independent contractor that the response was not received within pre-established limits; and
      automatically associating the performance of the building construction or maintenance task with a second independent contractor and initiating contact with the second independent contractor to request the performance of the building construction or maintenance task;
   receiving an estimate for the performance of the building construction or maintenance task; and
   selectively authorizing the performance of the building construction or maintenance task.

2. The method as recited in claim 1, further comprising a step for monitoring the performance of the building construction or maintenance task.

3. The method as recited in claim 1, wherein the step for monitoring the performance of the building construction or maintenance task comprises steps for:
   tracking events toward a completion of the construction or maintenance task; and
   reporting progress toward the completion of the construction or maintenance task.

4. The method as recited in claim 3, wherein the step for reporting progress toward the completion of the construction or maintenance task includes a step for generating a graphical report.

5. The method as recited in claim 1, wherein the estimate is received from one of (i) the first independent contractor and (ii) the second independent contractor.

6. The method as recited in claim 1, further comprising a step for evaluating the performance of the building construction or maintenance task.

7. The method as recited in claim 1, further comprising a step for requesting approval of the estimate received.

8. A computer-based method for using a computer system to selectively assign third party professional tasks to independent contractors and other third party service providers, the method comprising steps for:
   receiving a request across a network at a first computer system, wherein the request is from a third party for performance of a building construction or maintenance task;
   automatically associating the performance of the building construction or maintenance task with a first independent contractor of a database that includes a listing of a plurality of independent contractors, wherein the step for automatically associating is based on:
      (i) task type;
      (ii) experience level of the first independent contractor to perform this type of task;
      (iii) a dependability or quality rating of the first independent contractor in performing building construction or maintenance tasks for third parties;
      (iv) availability of the first independent contractor; and
      (v) physical proximity of the first independent contractor relative to the job site;
   automatically initiating contact across a network with the first independent contractor to request the performance of the building construction or maintenance task;
   if a response to the contact with the first independent contractor is not received within pre-established limits, performing at least one of the steps for:
      automatically associating the performance of the building construction or maintenance task with a second independent contractor of the database; and
      initiating contact with the second independent contractor to request the performance of the building construction or maintenance task;
   receiving at the first computer system an estimate for the performance of the building construction or maintenance task; and
   selectively providing an electronic authorization to perform the building construction or maintenance task.

9. The method as recited in claim 8, further comprising a step for monitoring performance of the building construction or maintenance task.

10. The method as recited in claim 8, further comprising a step for allocating a quality rating related to at least one of:
    (i) the first independent contractor; and
    (ii) the second independent contractor.

11. The method as recited in claim 8, further comprising a step for maintaining a change order summary corresponding to the building construction or maintenance task.

12. The method as recited in claim 8, further comprising a step for providing a customized report related to the building construction or maintenance task.

13. The method as recited in claim 8, wherein if the response to the contact with the first independent contractor is not received within pre-established limits, further performing a step for automatically notifying a quality control agent of the first independent contractor that the response was not received within pre-established limits.

14. A computer program product for implementing within a computer system a method for selectively assigning third party professional tasks to independent contractors and other third party service providers, the computer program product comprising:

a computer readable medium for providing computer program code means utilized to implement the method, wherein the computer program code means is comprised of executable code for implementing the steps for:

automatically associating a first independent contractor of an independent contractor database with a request received from a third party for performance of a building construction or maintenance task for the performance of the building construction or maintenance task, wherein the step for automatically associating is based on:
(i) task type;
(ii) experience level of the first independent contractor to perform this type of task;
(iii) a dependability or quality rating of the first independent contractor in performing building construction or maintenance tasks for third parties;
(iv) availability of the first independent contractor; and
(v) physical proximity of the first independent contractor relative to the job site;

automatically initiating contact with the first independent contractor to request the performance of the building construction or maintenance task;

if a response to the contact with the first independent contractor is not received within pre-established limits, performing the steps for:
automatically associating the performance of the building construction or maintenance task with a second independent contractor; and
initiating contact with the second independent contractor to request the performance of the building construction or maintenance task;
receiving an estimate for the performance of the building construction or maintenance task; and
providing an authorization for the performance of the building construction or maintenance task.

15. A computer program product as recited in claim 14, wherein the executable code further implements at least one of the steps for:

requesting approval of the estimate;

monitoring the selected service provider's performance during execution of the project;

allocating a quality rating related to at least one of (i) the first independent contractor and (ii) the second independent contractor;

maintaining a change order summary related to the building construction or maintenance task; and providing a customized report related to the building construction or maintenance task.

16. A computer program product as recited in claim 14, wherein the computer program code means is further comprised of executable code for implementing a step for if a response to the contact with the first independent contractor is not received within pre-established limits, automatically notifying a quality control agent of the first independent contractor that the response was not received within pre-established limits.

* * * * *